US008697019B2

(12) United States Patent
Chen et al.

(10) Patent No.: US 8,697,019 B2
(45) Date of Patent: Apr. 15, 2014

(54) NANOSTRUCTURED COMPOSITIONS HAVING REDUCED DISSOLUTION OF MANGANESE AND METHODS OF MAKING AND USING THE SAME

(75) Inventors: Huimin Chen, Willington, CT (US); Lei Jin, Vernon, CT (US)

(73) Assignee: Inframat Corporation, Farmington, CT (US)

( * ) Notice: Subject to any disclaimer, the term of this patent is extended or adjusted under 35 U.S.C. 154(b) by 562 days.

(21) Appl. No.: 12/452,967

(22) PCT Filed: Apr. 30, 2008

(86) PCT No.: PCT/US2008/062043
§ 371 (c)(1),
(2), (4) Date: Jun. 28, 2010

(87) PCT Pub. No.: WO2009/055090
PCT Pub. Date: Apr. 30, 2009

(65) Prior Publication Data
US 2012/0024799 A1 Feb. 2, 2012

Related U.S. Application Data

(63) Continuation-in-part of application No. 11/763,048, filed on Jun. 14, 2007, now Pat. No. 8,216,543, which is a continuation-in-part of application No. 11/581,504, filed on Oct. 16, 2006, now Pat. No. 7,655,148.

(60) Provisional application No. 60/926,851, filed on Apr. 30, 2007, provisional application No. 60/726,924, filed on Oct. 14, 2005.

(51) Int. Cl.
*C01B 13/00* (2006.01)

(52) U.S. Cl.
USPC ........ 423/275; 423/592.1; 423/632; 423/263; 423/594.19; 423/608; 423/625; 423/325; 423/594.8; 423/622; 423/604; 423/609; 977/773

(58) Field of Classification Search
USPC ......... 423/275, 592.1, 632–634, 263, 594.19, 423/608, 625, 325, 594.8, 622, 604, 609; 977/773
See application file for complete search history.

(56) References Cited

U.S. PATENT DOCUMENTS

| | | | |
|---|---|---|---|
| 4,036,662 A | 7/1977 | Rademachers et al. | |
| 4,376,714 A | 3/1983 | Pingaud | |
| 5,234,603 A | 8/1993 | Potts | |
| 5,487,954 A | 1/1996 | Chin et al. | |
| 5,700,974 A | 12/1997 | Taylor | |
| 6,123,854 A | 9/2000 | Iwane et al. | |
| 6,162,530 A * | 12/2000 | Xiao et al. | 428/292.1 |
| 6,383,395 B1 | 5/2002 | Clarke et al. | |
| 6,517,802 B1 | 2/2003 | Xiao et al. | |
| 6,534,032 B2 | 3/2003 | Meisen | |
| 6,596,915 B1 | 7/2003 | Satyapal et al. | |
| 6,719,821 B2 | 4/2004 | Yadav et al. | |
| 6,764,601 B1 | 7/2004 | Levy et al. | |
| 6,790,363 B2 | 9/2004 | Vempati | |
| 6,843,919 B2 | 1/2005 | Klabunde et al. | |
| 6,953,763 B2 | 10/2005 | Vempati et al. | |
| 7,014,881 B2 | 3/2006 | Liu et al. | |
| 7,033,487 B2 | 4/2006 | O'Connor et al. | |
| 7,153,438 B2 | 12/2006 | Souter et al. | |
| 7,211,320 B1 | 5/2007 | Cooper et al. | |
| 7,416,655 B2 | 8/2008 | Toledo Antonio et al. | |
| 7,517,802 B2 | 4/2009 | Cooney, III et al. | |
| 7,645,439 B2 | 1/2010 | Toledo Antonio et al. | |
| 7,655,148 B2 * | 2/2010 | Chen et al. | 210/688 |
| 8,216,543 B2 * | 7/2012 | Chen et al. | 423/608 |
| 2002/0187889 A1 * | 12/2002 | Lauf et al. | 501/1 |
| 2004/0224836 A1 * | 11/2004 | Vempati et al. | 502/64 |

FOREIGN PATENT DOCUMENTS

| | | | |
|---|---|---|---|
| DE | 19923625 A1 | 11/2000 | |
| WO | 98/22387 | * 5/1998 | |
| WO | 01/93348 | * 12/2001 | |
| WO | WO0220396 A2 | 3/2002 | |
| WO | WO0226631 A1 | 4/2002 | |
| WO | WO03068683 A1 | 8/2003 | |
| WO | WO 2004009232 A1 * | 1/2004 | ............... B01J 23/34 |
| WO | WO2004032624 A2 | 4/2004 | |
| WO | WO2004065619 A2 | 8/2004 | |
| WO | WO2004076364 A1 | 9/2004 | |
| WO | 2005/060610 | * 7/2005 | |
| WO | WO2006065825 A2 | 6/2006 | |
| WO | WO2006087432 A1 | 8/2006 | |
| WO | WO2007047624 A1 | 4/2007 | |

OTHER PUBLICATIONS

Abe, M., "Inorganic Ion Exchange Materials", 1982, p. 161-273, Chapter 6, CRC Press, Boca Raton, Florida.
Ali, S.A. and H.J. Achs, "Seperation and Purification of Fission Products from Process Streams of Irradiated Nuclear Fuel" Inorganic Ion Exchangers and Adsorbents for Chemical Processing in the Nuclear Fuel Cycle, Jun. 12-15, 1984, p. 133-142; IAEA-TECDOC-337, International Atomic Energy Agency, Vienna.

(Continued)

*Primary Examiner* — Steven Bos
(74) *Attorney, Agent, or Firm* — Cantor Colburn LLP

(57) ABSTRACT

Nanostructured manganese-containing compositions having reduced manganese dissolution and methods of making and using the same are provided. In one embodiment, a composition of matter comprises a nanostructured oxide or hydroxide doped with $Mn^{4+}$. The composition of matter can be made by forming a nanostructured oxide or hydroxide material doped with $Mn^{3+}$ and oxidizing the $Mn^{3+}$ to $Mn^{4+}$ to reduce dissolution of the manganese in the nanostructured oxide or hydroxide material. In another embodiment, a method of reducing dissolution of manganese present in a nanostructured $MnO_2$ material comprises: doping a nanostructured $MnO_2$ material with $Fe^{3+}$ to reduce the dissolution of the manganese.

11 Claims, 27 Drawing Sheets

(56) References Cited

OTHER PUBLICATIONS

Anderson, T.C. et al, "A radium Assay Technique Using Hydrous Titanium Oxide Adsorbent for the Sudbury Neutrino Observatory", Nuclear Instruments and Methods of Physics in Research, 2003, p. 386-398, 501, Elsevier Science B.V.
Badruzzaman, Mohammad et al, "The Application of Rapid Small—Scale Column Tests in Iron-based Packed Bed Arsenic Treatment Systems", Advances in Arsenic Research, 2005, p. 268-283, Chapter 19, American Chemical Society, Washington, D.C.
Chen, C.J. et al, "Atherogenicity and Carcinogenecity of High-Arsenic Artesian Well Water", Arteriosclerosis, 1988, p. 452-460 vol. 8, No. 5, Institute of Public Health, Taipei, Taiwan.
Clifford, D.A., et al, "Arsenic Chemistry and Speciation", Proceeding Water Quality Technology Conference, 1993, p. 1955-1969, American Water Works Association, Denver, Colorado.
Clifford, D.A., "Ion Exchange and Inorganic Adsorption", Water Quality and Treatment, 1999, p. 561-639, Capter 9, 5th Edition, McGraw Hill.
Crittenden, John C et al., "Design of Rapid Small—Scale Adsorption Tests for a Constant Diffusivity", Journal WPCF, 1986, p. 312-319, vol. 58, No. 4.
Ferreccio, C. et al, "Lung Cancer and Arsenic Concentrations in Drinking Water in Chile", Epidemiol, 1999, p. 673-679, 200011(6), Lippincott Williams and Wilkins, Inc., Washington, D.C.
Ghurye, G. et al., "Laboratory Study on the Oxidation of Arsenic III to Arsenic V", 2001, EPA/600/R-01/021. pp. 1-100.
Guhamazumder, D.N. et al, "Arsenic Levels in Drinking Water and the Prevalence of Skin Lesions in West Bengal, India", International Journal of Epidemiology, 1998, p. 871-877, 27 (5), International Epidemiology Association.
Hasany, S.M. et al, "Sorption of Selenium at Micromolar Levels onto Hydrous Titanium Oxide from Aqueous Solutions using Radiotracer Technique", Appl. Radiat. Isot., 1997, p. 595-600, vol. 48, Elsevier Science Ltd., Great Britain.
Hathaway, S.W. et al, "Removing Arsenic from Drinking Water", 1987, p. 61-65, 79 (8), Journal AWWA.
Hering, J.G., "Arsenic Removal by Ferric Chloride", 1996, p. 155-167, 88 (4), AWWA.
International Search Report and Written Opinion for International Application PCT/US2006/040458, International filing date 16/110/2006 Report Mail date Mar. 28, 2007 (16 pages).
International Search Report and Written Opinion for International Application PCT/US2007/013911, International Filing Date Jun. 14, 2007 Report Mail date Mar. 4, 2008 (16 pages).
International Search Report and Written Opinion for International Application PCT/US2008/062043; filed Apr. 30, 2008 Report Mail Date Feb. 9, 2009 (15 pages).
JP08-103655 Published Apr. 23, 1996 Patent Abstracts of Japan—1 page.
Mustafa, S. et al, "Surface Properties of the Mixed Oxides of Iron and Silica", Colloides and Surfaces, Physicochemical and Engineering Aspects, 2002, p. 273-282, Elsevier Science B.V.
Rosenblum, E.R. et al, "The Equilibrium Arsenic Capacity of Activated Alumina", EPA, 1984, 600/52-83-107, Cincinnati, Ohio.
Rubel, Jr, Frederick, "Removal of Arsenic from Drinking Water by Adsorptive Media", EPA/600/R-03-019, US Environmental Protection Agency, 2003, Cincinnati, Ohio. (pp. 1-89).
Ruvarac, A. "Group IV Hydrous Oxides-Synthetic Inorganic Ion Exchangers" Inorganic Ion Exchange Materials, Chapter 5, 1982, p. 142-160, Clearfield CRC Press, Boca Raton, Florida.
Samanta G. and Clifford D., "Preservation of Inorganic Arsenic Species in Groundwaters", Environmental Science and Technology, 2005, 39(22), 8877-8882, American Chemical Society.
Samanta, G., "Preservation and Field-Preservation of Inorganic Arsenic Species in Groundwater", Water Quality Research Journal of Canada, 2006, p. 107-116, 41 (2), Houston, Texas.
Schmidt, K., et al. "Nanotechnology in the Environment Industry: Opportunities and Trends", Final Report and Bibliography for the Nano-environmental Cross-Sector Initiative, Mar. 4, 2005, 55 pages.
Suzuki, T.M. et al, "Preparation of Porous Resin Loaded with Crystalline Hydrous Zirconium Oxide and its Application to the Removal of Arsenic", Reactive and Functional Polymers, 2000, p. 165-172, Elsevier Science B.V.
Tom Sorg et al, "Treatment Options Part 1", Water Supply and Water Resources Division Office of Research and Development, Cincinnati, Ohio. pp. 1-26.
Vassileva, E. et al., "Chromium Speciation Analysis by Solid-Phase Extraction on a High Surface Area TiO2" Analyst, The Analyst, 2000, p. 125; 693-698, The Royal Society of Chemistry.
Vesely, V. et al, "Synthetic Inorganic Ion-Exchangers-I", Talanta Review, 1972, p. 219-262, Nuclear Research Institute of the Czechoslovak Academy of Sciences.

\* cited by examiner

NANOSTRUCTURED COMPOSITIONS HAVING REDUCED DISSOLUTION OF MANGANESE AND METHODS OF MAKING AND USING THE SAME

CROSS REFERENCE TO RELATED APPLICATION

This application claims the benefit of U.S. Provisional Patent Application No. 60/926,851 filed on Apr. 30, 2007. Further, this application is a continuation-in-part of U.S. patent application Ser. No. 11/763,048 filed on Jun. 14, 2007 now U.S. Pat. No. 8,216,543, which is a continuation-in-part of U.S. patent application Ser. No. 11/581,504 filed on Oct. 16, 2006 now U.S. Pat. No. 7,655,148, which claims the benefit of U.S. Provisional Patent Application No. 60/726,924 filed on Oct. 14, 2005. This application claims priority to all of the foregoing patent applications and incorporates by reference herein in their entirety all of the foregoing patent applications.

STATEMENT REGARDING FEDERALLY SPONSORED RESEARCH

The United States Government has certain rights to this disclosure pursuant to Air Force Flight Test Center Contract Nos. F04611-03-M-1007 and FA9300-04-C-0033.

BACKGROUND

The present disclosure generally relates to pollution control, and more particularly to reducing the dissolution of manganese present in a nanostructured material used for pollution control such as water treatment.

Natural or synthetic manganese-containing materials have been widely used in water treatment applications. Such materials are currently used to scavenge heavy metals from contaminated water such as drinking water and waste water. For example, manganese dioxide ($MnO_2$) can oxidize metal ions such as ferrous ions in water. In some circumstances, the oxidized contaminants can undergo precipitation to allow them to be filtered from the water. Manganese dioxide can also be employed to adsorb lead in water. Manganese dioxide is particularly useful in removing arsenic from drinking water by oxidizing As(III) to As(V). The manganese dioxide has good As(V) adsorption capacity. Manganese ($Mn^{3+}$) doped iron oxide is also an excellent adsorbent for As(V) in water. The use of hydrous manganese dioxide to remove radium from water has also been reported.

Unfortunately, the use of manganese-containing materials to remove contaminants from the water can result in the dissolution of manganese in the water such that it contains undesirable levels of manganese as defined by the National Sanitation Foundation International (NSFI, an independent, not-for-profit, non-governmental organization. In particular, the NSFI requires that materials in contact with drinking water shall not impart levels of extractable contaminants that exceed the maximum drinking water level (MDWL) value or the maximum contaminant concentration (MCC) value. The MDWL for manganese is 0.3 milligram/Liter (mg/L), and the MCC for manganese is 0.05 mg/L.

BRIEF SUMMARY

Disclosed herein are manganese-containing compositions having reduced manganese dissolution and methods of making and using the same. In one embodiment, a composition of matter comprises a nanostructured oxide or hydroxide doped with $Mn^{4+}$. The composition of matter can be made by forming a nanostructured oxide or hydroxide material doped with $Mn^{3+}$ and oxidizing the $Mn^{3+}$ to $Mn^{4+}$ to reduce dissolution of the manganese in the nanostructured oxide or hydroxide material.

In another embodiment, a method of reducing dissolution of manganese present in a nanostructured $MnO_2$ material comprises doping a nanostructured $MnO_2$ material with $Fe^{3+}$ or other 3+ ions having an ion radius similar to $Mn^{3+}$ to reduce the dissolution of the manganese.

In yet another embodiment, a method for treating water comprises: contacting water with a water treatment composition comprising (a) a nanostructured $MnO_2$ material doped with $Fe^{3+}$ or (b) a nanostructured oxide or hydroxide doped with $Mn^{4+}$; and at least partially removing a contaminant from the water.

The above described and other features are exemplified by the following detailed description and attachments.

BRIEF DESCRIPTION OF THE DRAWINGS

Referring now to the figures, which are exemplary embodiments and wherein like elements are numbered alike.

DETAILED DESCRIPTION

Composite Water Treatment Compositions

Figure 1:
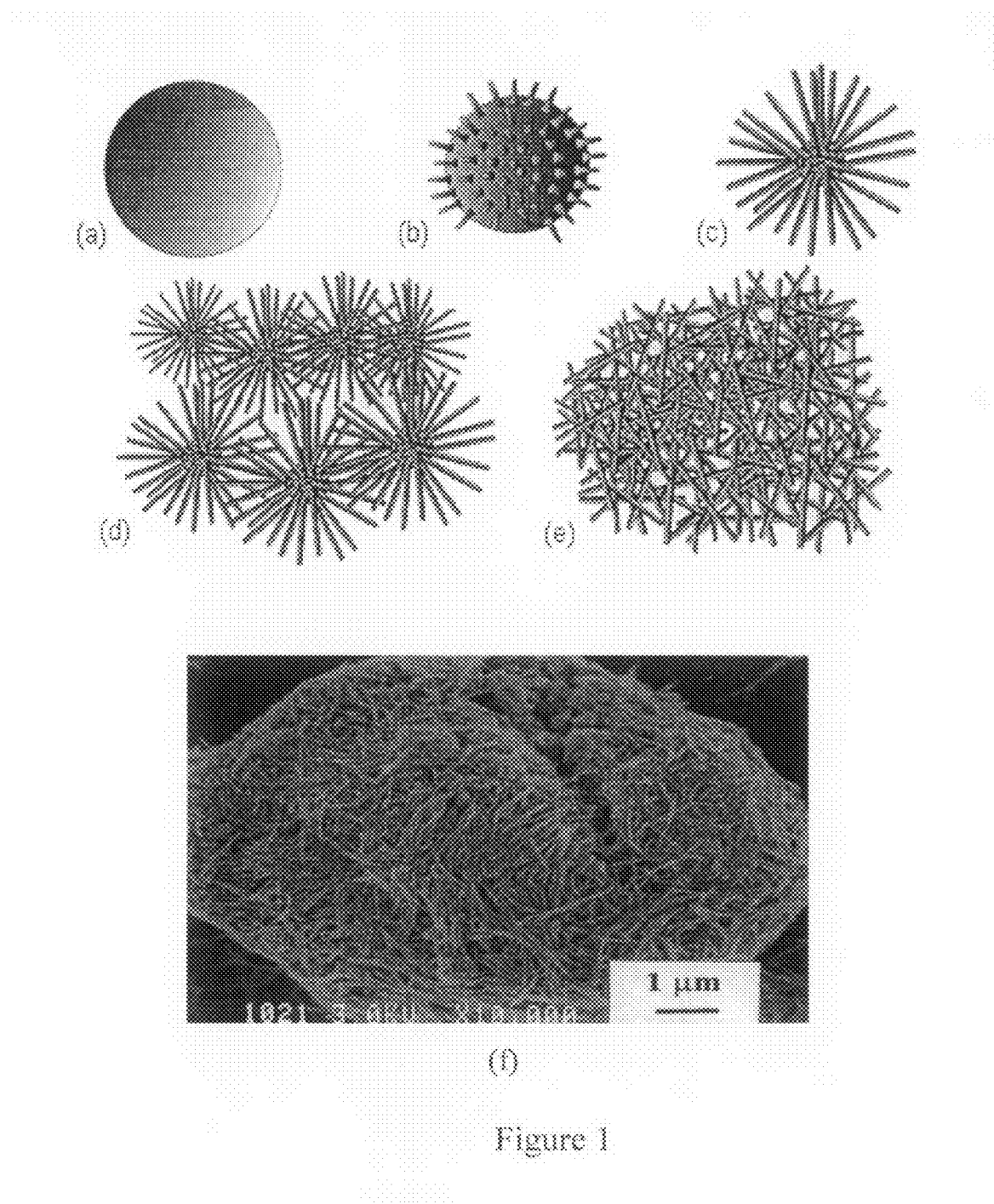
FIG. 1 schematically illustrates the transformation of $MnO_2$ nanoparticle agglomerates into a mass of interconnected nanofibers, starting with (a) a nanoparticle, then (b) nucleation of embryonic nanofibers, followed by (c) transformed long fibers, (d) fiber bundles, and finally (e) a fully developed bird's-nest superstructure, which is also shown in (f) a scanning electron microscope (SEM) image.

Water treatment compositions and methods of making and using the same are described. The water treatment compositions are composite materials comprising both an oxidizing component and an absorbing or adsorbing (absorbing/adsorbing) component. The oxidizing component has the ability to oxidize another substance by removing electrons from the other substance. Absorption refers to a phenomenon in which atoms, molecules, or ions enter a bulk phase, e.g., a gas, liquid, or solid phase. Adsorption refers to a phenomenon in which atoms, molecules, or ions are taken up by the surface rather than the volume of a material. Thus, an absorbing component has the ability to absorb atoms, molecules, or ions into its bulk volume, and an adsorbing component has the ability to adsorb atoms, molecules, or ions into its surface.

Examples of suitable oxidizing components include but are not limited to oxides, hydroxides, or oxyhydroxides of manganese, silver, or titanium, and combinations comprising at least one of the foregoing materials. Examples of suitable absorbing/adsorbing components include but are not limited to oxides, hydroxides, or oxyhydroxides of iron, titanium, zirconium, aluminum, manganese, and combinations comprising at least one of the foregoing materials. The oxidizing component can be doped. In addition, or in the alternative, the absorbing/adsorbing component can be doped. It is desirable for the oxidizing component and the absorbing/adsorbing component to have different nominal compositions. Thus, the oxidizing component and the absorbing/adsorbing component can have overlapping elements or constituents while having different overall compositions.

In an exemplary embodiment, the oxidizing component is a manganese oxide such as $MnO_2$, an iron-doped manganese oxide, or a combination comprising at least one of the foregoing; and the absorbing/adsorbing component is an iron oxide such as $Fe_2O_3$, a Mn- or La-doped iron oxide, a zirconium hydroxide, a Mn- or Fe-doped zirconium hydroxide, a titanium hydroxide, a Mn- or Fe-doped titanium hydroxide, or a combination comprising at least one of the foregoing.

One or both of the oxidizing component and the absorbing/adsorbing component can be nanostructured and thus can be combined to form a so-called "nanocomposite" material. The term "nanostructured", as used herein, refers to particles having an average longest grain dimension of less than about 250 nanometers (nm). For example, the particles can have an average longest grain dimension of about 1 nm to about 100 nm, specifically about 1 nm to about 10 nm. In an exemplary embodiment, the nanocomposite includes granules or agglomerates of particles having an average longest dimension of at least one micrometer (micron), specifically about 1 micron to about 200 microns. The water treatment compositions can comprise, for example, greater than about 60 volume % by total volume of the composition of such granules or agglomerates, specifically greater than about 90 volume %.

The oxidizing or absorbing/adsorbing component, e.g., a nanostructured metal oxide or a metal hydroxide, can be doped using the following process. First, a metal precursor solution and a dopant precursor solution can be dispersed in water to form a slurry. Examples of suitable metal precursors include but are not limited to an iron salt, a manganese salt, a zirconium oxy salt, a titanium oxy salt, and combinations comprising at least one of the foregoing salts. Examples of suitable dopant precursors include but are not limited to, a lanthanum salt, a manganese salt, or a combination comprising at least one of the foregoing salts. Subsequently, the slurry can be heated at a temperature of about 30° C. to about 200° C. Further, a base such as an alkaline hydroxide can be added to the slurry to increase its pH. The alkaline hydroxide could be, for example, sodium hydroxide, ammonium hydroxide, or a combination comprising at least one of the foregoing hydroxides. As a result of this heating of the slurry, the doped metal oxide or hydroxide precipitates out of the slurry. The precipitate can then be washed and filtered prior to or during the washing. It can further be dried by subjecting it to a temperature of about 100° C. to about 300° C.

A nanocomposite can be formed by a process that includes dispersion of the as-synthesized powders (i.e., doped or undoped metal oxides or hydroxides) in a liquid medium, adding a binder, spray drying to form beads, and post heat treating to remove unwanted species. In aqueous liquid mediums, the binder can include, for example, an emulsion of commercially available polyvinyl alcohol (PVA), polyvinylpyrrolidone (PVP), carboxymethyl cellulose (CMC), or other water-soluble polymers, preferably suspended in deionized water. In this case, the amount of binder present can be about 0.5 wt. % to about 5 wt. % based on the total weight of the slurry.

After formation of the slurry including a nanostructured material, the slurry is spray-dried in hot air to form larger granules or agglomerated nanoparticles. While many suitable non-reactive gases or mixtures thereof can be used, nitrogen or argon is preferred. The temperature at which the slurry is spray-dried can be, for example, about 150° C. to about 350° C., specifically about 150° C. to about 250° C. The agglomerates can further be optionally subjected to a high temperature heat treatment to remove the binder, for example, at a temperature of about 350° C. to about 500° C.

Desirably, the water treatment compositions are highly porous overall, allowing the water being treated to penetrate easily therethrough and contaminants to be absorbed/adsorbed during treatment. To achieve a high porosity in the water treatment compositions in accordance with an exemplary embodiment, one or both of the oxidizing component and the absorbing/adsorbing component can be transformed from nanoparticle agglomerates to a random, interconnected open-weave assembly of "nanofibers", often referred to as a "bird's nest" structure, as shown in FIG. 1. A detailed description of this transformation can be found in U.S. Pat. No. 6,162,530 to Xiao et al., which is incorporated by reference herein. As used herein, the term "nanofiber" refers to a fiber having a diameter of less than about 250 nm, specifically less than about 50 nm, and more specifically about 5 to about 10 nm. The nanofibers can have an aspect ratio (length/diameter ratio) of greater than about 10, and they can be spaced about 0.5 to about 200 nm apart from each other, more specifically about 5 to about 50 nm apart from each other. The porosity of the water treatment compositions can be, for example, greater than about 60 volume %, specifically greater than about 80 volume %. Another approach to achieving high porosity in the water treatment compositions is to use the above described doping technique to dope the metal oxide or hydroxide during material synthesis.

In one exemplary embodiment, the water treatment compositions can be disposed on a porous substrate such as activated carbon, alumina, or silica gel. One exemplary method for loading the water treatment composition on a porous substrate can be by a wet recipient impregnation process. Alternatively, the water treatment compositions can be incorporated into a water filtration device such as a carbon block filtration cartridge containing activated carbon for removing chlorine and organic matter, making the water less distasteful to consumers. For example, a carbon block filtration cartridge can be formed by combining a nanocomposite of an oxidizing component and an absorbing component with an activated carbon powder and a binder for binding the nanocomposite granules to the activated carbon powder. The resulting mixture is then formed into the shape of the filtration cartridge, for example, by compression molding.

The water treatment compositions are useful for removing contaminants from water. Examples of specific contaminants include but are not limited to arsenic, lead, chromium, mercury, and combinations comprising at least one of the foregoing contaminants. A method for using any of the water treatment compositions disclosed herein generally includes contacting water with the water treatment composition and at least partially removing a contaminant from the water. In one exemplary embodiment, at least partially removing the contaminant includes oxidizing the contaminant and absorbing/adsorbing the oxidized contaminant. The adsorption of a contaminant onto the water treatment compositions generally occurs by ligand exchange. Advantageously, because these contaminants strongly bond to the water treatment media, the media, once exhausted, can be disposed of as a non-hazardous waste in landfills.

Nanostructured Compositions Having Reduced Dissolution of Manganese

Nanostructured manganese dioxide outperforms regular manganese dioxide as an oxidant of contaminants in water. Further, manganese ($Mn^{3+}$) doped oxides and hydroxides also are outstanding adsorbents of contaminants such as As(V) and Pb(II). However, nanostructured manganese dioxide and $Mn^{3+}$-doped oxides and hydroxides undergo severe dissolution in water, resulting in the presence of undesirable levels of manganese in the water.

Therefore, nanostructured manganese-comprising compositions having reduced manganese dissolution have been developed. Such compositions can be used as water treatment compositions or nuclear waste treatment compositions without being concerned that undesirable levels of manganese could leach into the material being treated.

In an embodiment, a nanostructured manganese-comprising composition includes particles having diameters of about 1 to about 100 nanometers. The particles can be arranged in agglomerates having diameters of about 0.1 to about 200 microns. The nanostructured composition can comprise greater than about 60 volume %, specifically greater than about 90 volume % of such agglomerates. The porosity of the nanostructured composition can be greater than about 60 volume %, specifically greater than about 80 volume %, which allows fluid to easily flow through the structure.

In another embodiment, the nanostructured composition is also in the form of a random, interconnected open-weave assembly of "nanofibers", referred to as a "bird's nest" structure. As used herein, the term "nanofiber" refers to a fiber having a diameter of less than about 250 nm, specifically less than about 50 nm, and more specifically about 5 to about 10 nm. The nanofibers can have an aspect ratio (length/diameter ratio) of greater than about 10, and they can be spaced about 0.5 to about 200 nm apart from each other, more specifically about 5 to about 50 nm apart from each other.

In one exemplary embodiment, the nanostructured composition is a nanostructured oxide or hydroxide doped with $Mn^{4+}$. Examples of suitable oxides or hydroxides include but are not limited to oxides or hydroxides of iron, zirconium, titanium, nickel, yttrium, aluminum, silicon, magnesium, vanadium, molybdenum, zinc, silver, cobalt, copper, tungsten, and other rare earth metals.

Figure 32:
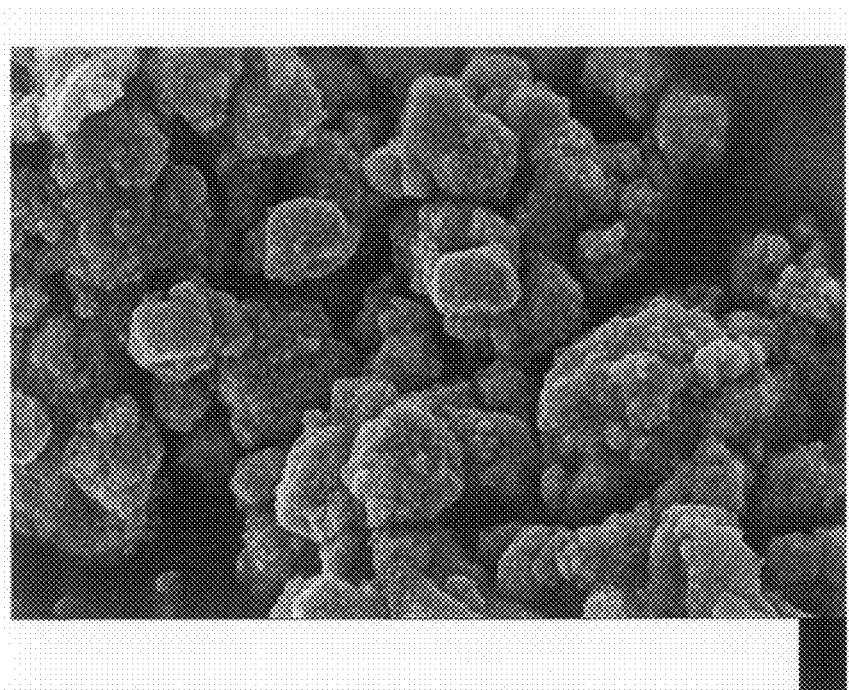
FIG. 32 depicts a scanning electron microscope (SEM) image of undoped nanostructured $Fe_2O_3$.
Figure 33:
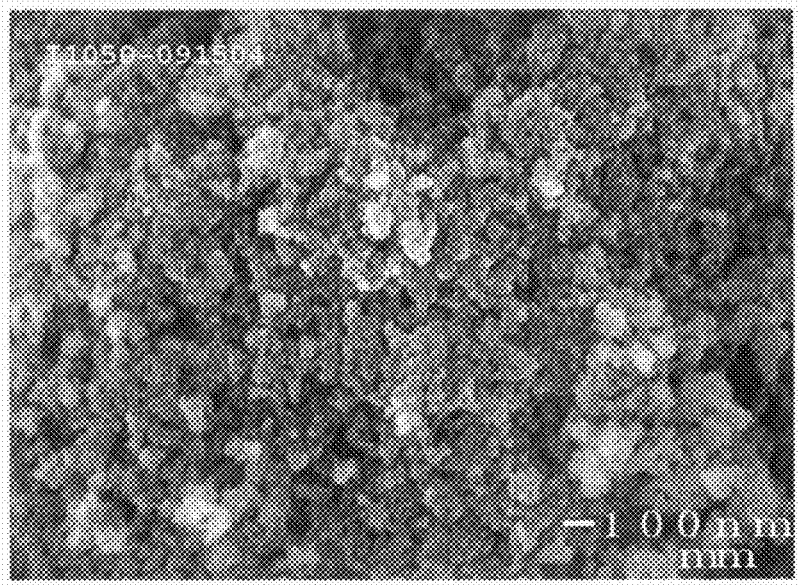
FIG. 33 depicts a SEM image of nanostructured manganese-doped $Fe_2O_3$.

In an embodiment, the nanostructured oxide or hydroxide doped with $Mn^{4+}$ can be made by first forming a nanostructured oxide or hydroxide material doped with $Mn^{3+}$, followed by oxidizing the $Mn^{3+}$ to $Mn^{4+}$. A description of the synthesis of nanostructured oxides or hydroxides doped with $Mn^{3+}$ can be found in U.S. Pat. No. 6,162,530 to Xiao et al., which is incorporated by reference herein in its entirety. For example, the nanostructured oxide or hydroxide can be formed by first combining a manganese salt and a metal salt with an aqueous starter solution. Further, an oxidant such as permanganate can be combined with an aqueous reactant solution. The aqueous reactant solution can then be co-atomized into the aqueous starter solution to precipitate a nanostructured oxide or hydroxide powder, wherein $Mn^{2+}$ present in the aqueous starter solution is oxidized to $Mn^{3+}$. This powder can optionally be heat treated to yield the desired crystalline phase. The crystalline phase can be isolated and subjected to ultrasonication to disintegrate any powder aggregates and to introduce lattice defects into the nanocrystalline powders. The ultrasonicated powder can be spray-dried to produce agglomerates of nanostructured particles. FIGS. 32 and 33 illustrate the structural difference between undoped and Mn-doped nanostructured $Fe_2O_3$. In particular, FIG. 32 depicts a SEM image of undoped nanostructured $Fe_2O_3$ which comprises agglomerates of nanostructured particles; and FIG. 33 depicts a SEM image of nanostructured Mn-doped $Fe_2O_3$ which is much more porous than the undoped $Fe_2O_3$. In some cases, as illustrated by FIG. 1, the nanoparticle agglomerates are transformed into a mass of interconnected nanofibers.

The nanostructured oxide or hydroxide can be doped with a sufficient amount of $Mn^{3+}$ to optimize its adsorption capacity of contaminants such as As(V) and Pb(II). For example, the weight ratio of the manganese salt to the metal salt in the aqueous starter solution can be about 0.1 to about 0.5, specifically about 0.1 to about 0.25, and more specifically about 0.1.

The oxidation of the $Mn^{3+}$ dopant can be carried out by contacting it with a stoichiometric amount of an oxidant such as hypochlorate, $Cl_2$, $Br_2$, $F_2$, OBr—, $MnO_4$—, and $Na_2O_2$. Without being limited by theory, it is believed that the $Mn^{3+}$ ions in such nanostructured oxides or hydroxides are the source of severe dissolution of manganese in fluids such as water. Therefore, the oxidation of the $Mn^{3+}$ ions to $Mn^{4+}$ ions serves to remove the source of the manganese dissolution and thus reduces such dissolution.

In another exemplary embodiment, the nanostructured composition is a nanostructured manganese dioxide ($MnO_2$) doped with $Fe^{3+}$ (ferric iron). This nanostructured composition can be formed in the same manner as the nanostructured oxide or hydroxide described above with the exception that the aqueous starter solution contains a manganese salt such as manganese sulfate and a ferric iron salt such as ferric chloride or ferric nitrate. The mole ratio of the ferric iron salt to the manganese salt can be about 0.02 to about 0.5, more specifically about 0.04 to about 0.25, and even more specifically about 0.04 to about 0.08.

The synthesis of the $MnO_2$ described above includes two electron transfer steps: (1) oxidation of $Mn^{2+}$ to produce $Mn^{3+}$ oxyhydroxide as an intermediate reaction product on the surface; and (2) subsequent oxidation of the $Mn^{3+}$ oxyhydroxide surface species to produce $MnO_2$. Some surface $Mn^{3+}$ ions can remain unoxidized and incorporated into the $MnO_2$ structure. As described above, the $Mn^{3+}$ ions undergo severe dissolution in fluid. Since $Fe^{3+}$ has the same ion radius and the same charge as $Mn^{3+}$, it is an excellent dopant for the $MnO_2$ structure. Thus, the $Fe^{3+}$ ions can replace the $Mn^{3+}$ ions, dramatically reducing the dissolution of the manganese.

The nanostructured compositions disclosed herein can be used to remove contaminants from water or a waste material, e.g., nuclear waste, by contacting the water or waste material with the compositions. The nanostructured compositions can oxidize, adsorb, and/or absorb such contaminants. Examples of specific contaminants include but are not limited to metallic or cationic arsenic, lead, chromium, mercury, uranium, radium, or a combination comprising at least one of the foregoing.

The disclosure is further illustrated by the following non-limiting examples.

Example 1

Manganese Dioxide Nanofiber Synthesis and Characterization $MnO_2$ was synthesized by oxidizing manganese sulfate ($MnSO_4$) with potassium permanganate ($KMnO_4$) under acidic conditions according to reaction (1).

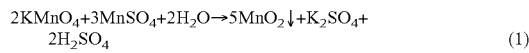

(1)

The reaction time and temperature were adjusted to control the crystallinity, morphology, and catalytic activity of the material. A schematic illustration showing the gradual transformation of $MnO_2$ nanoparticle agglomerates into a mass of interconnected nanofibers is shown in FIG. 1. These transformations can be controlled by adjusting time and/or temperature of the reaction. It is believed that the $MnO_2$ is more active in the nucleation and growth stages than during the other stages.

Figure 2:
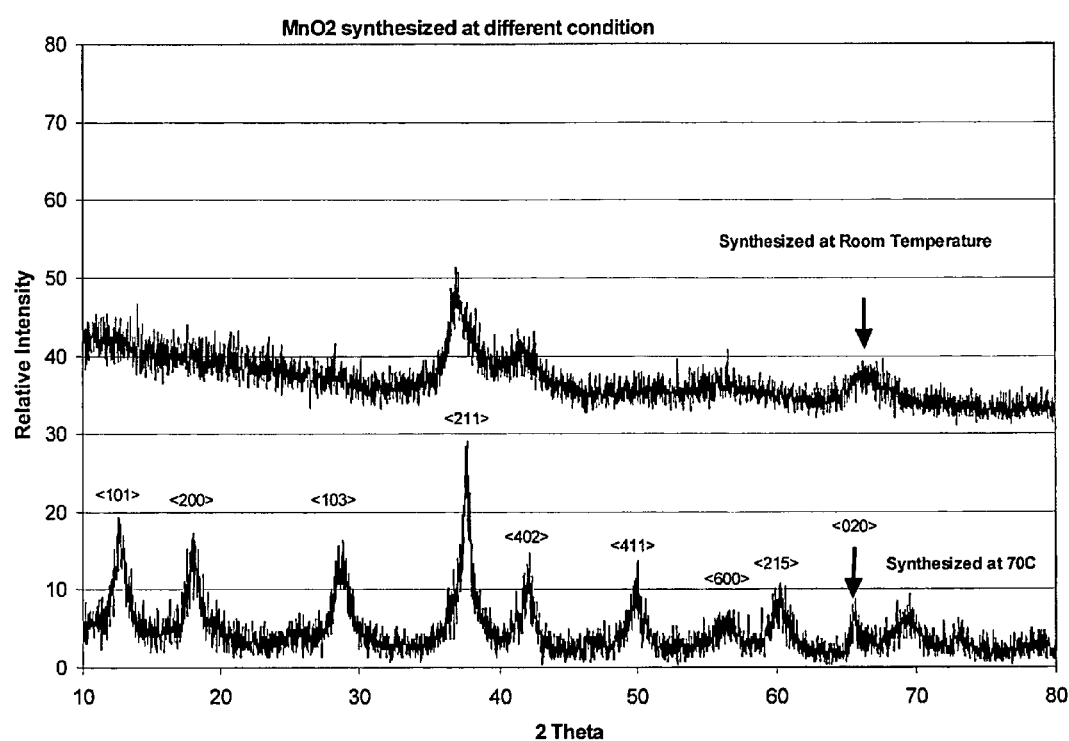
FIG. 2 illustrates powder X-ray diffraction patterns for two different samples of $MnO_2$.

Powder X-ray diffraction (XRD) patterns of the $MnO_2$ were obtained on a Broker D5005 or D8 diffractometer equipped with a 2.2 kilowatt (kW) copper X-ray tube. The equipment was run at 40 kilovolts (kv) and 20 milliAmpere (mA) by step-scanning with increments of 5 degrees per minute (°/min). XRD analysis (as shown in FIG. 2) revealed that the synthesis temperature had a great influence on the crystallinity. The $MnO_2$ material synthesized at 70 degrees Celsius (° C.) possessed better crystallinity than the one synthesized at room temperature (about 23° C.). The peak associated with the <020> direction was narrower than all other peaks, indicating that the crystallites were elongated along the <020> direction. In addition, the broadness of this peak is associated with the length of fiber. Specifically, the broader the peak, the shorter the fiber. It is apparent that the <020> peak of $MnO_2$ synthesized at room temperature was much broader compared with that synthesized at 70° C., suggesting that the $MnO_2$ synthesized at room temperature had a shorter fiber length.

Figure 3:
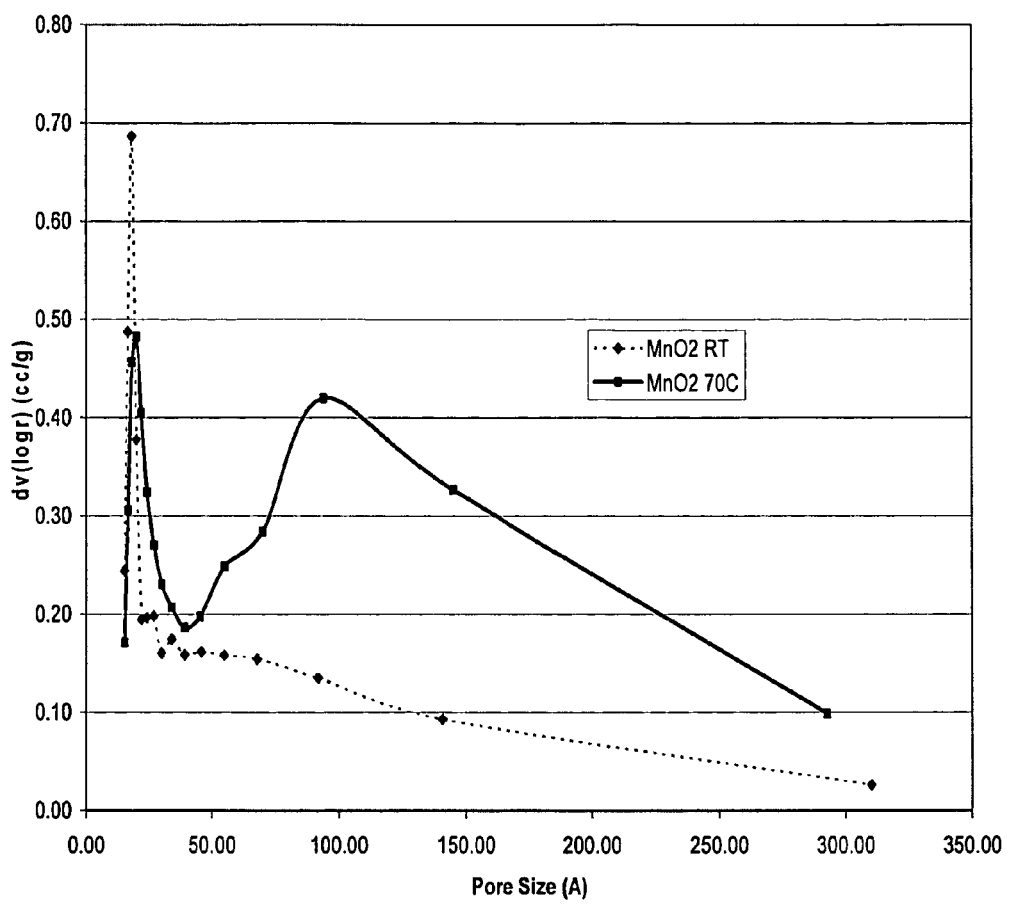
FIG. 3 graphically illustrates the effect of synthesis temperature on mesopore size distribution of $MnO_2$.

Specific surface area (SSA), total pore volume, micropore volume, and mesopore size distribution of the as-synthesized $MnO_2$ nanofibers were analyzed on a NOVA4200e surface area and pore size analyzer sold by QuantaChrome Instruments using the BET method. SSA and pore analyses of $MnO_2$ samples are listed in Table 1. Pores are classified by diameter as micropores (<20 Angstroms (Å)), mesopores (20 to 500 Å) and macropores (>0 Å). The $MnO_2$ synthesized at room temperature possessed a higher SSA than the $MnO_2$ synthesized at 70° C., although its total pore volume was lower. This suggested that it had a smaller particle size, contained micropores, or both. The results shown in Table 1 confirmed that $MnO_2$ synthesized at room temperature contained micropores, which contributed about 75 square meters per gram ($m^2/g$) of its 259 $m^2/g$ SSA. Mesopore size distributions of these two materials are shown in FIG. 3.

TABLE 1

| | BET surface area and pore analyses | | | | |
|---|---|---|---|---|---|
| $MnO_2$ | SSA ($m^2/g$) | Total Pore Volume (cc/g) | Micropore Volume (cc/g) | Micropore Area ($m^2/g$) | Mesopore size distribution |
| Room Temp | 259 | 0.29 | 0.04 | 75 | Peak at 18 Å |
| 70° C. | 190 | 0.39 | 0 | 0 | Peaks at 20 and 93 Å. |

The $MnO_2$ synthesized at room temperature exhibited a singular pore size distribution with a pore radius peak of about 17 Å. In contrast, the $MnO_2$ synthesized at 70° C. exhibited a bimodal pore size distribution with pore radii peaks at about 20 Å and about 93 Å, respectively. The 93 Å peak was much broader than the 20 Å peak; it covered a pore radius of about 50 Å to about 300 Å. Most pores in this range were interparticle voids that formed among particles. Theoretically, both micropores and mesopores are accessible for arsenic species in the water, because the radius of arsenic ions, such as $AsO_4^{3-}$ with r=0.47 Å and $H_3AsO_3$ with r=0.69 Å, are much smaller than the sizes of the observed micropores and mesopores.

Figure 4:
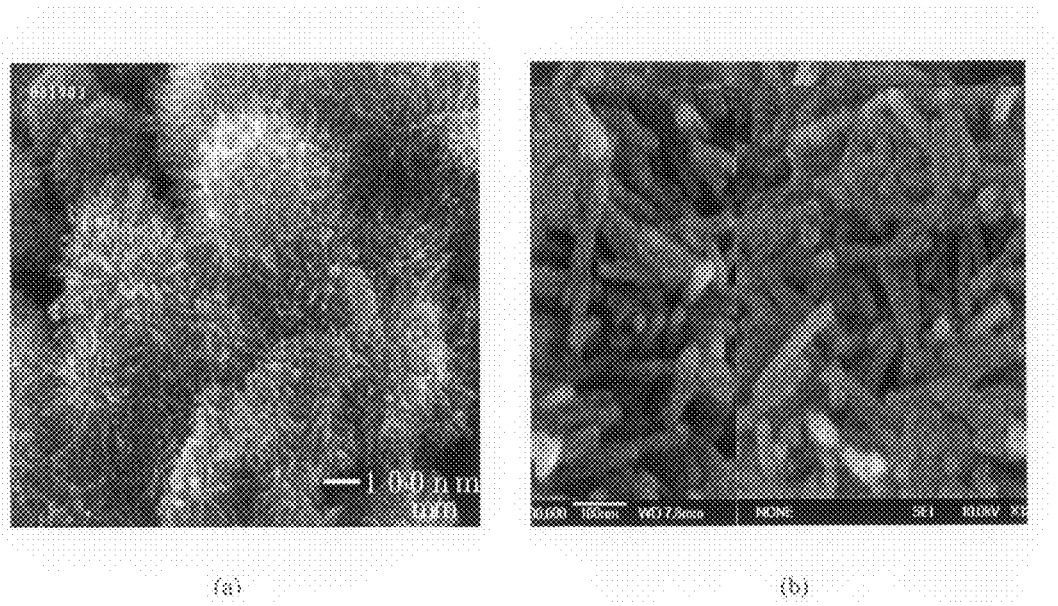
FIG. 4 illustrates high resolution scanning electron microscope (HR-SEM) images of $MnO_2$ synthesized at (a) room temperature and (b) 70° C.

High resolution scanning electron microscope (HR-SEM) images were acquired at 10 kilo-electron Volts (KeV) using a JEOL 890 Miens SEM. HR-SEM images of $MnO_2$ are shown in FIG. 4. The $MnO_2$ synthesized at room temperature appeared to have a spiked ball morphology, while the $MnO_2$ synthesized at 70° C. exhibited a nanofiber morphology. Based on FIG. 1, the $MnO_2$ synthesized at room temperature appeared to still be in the growing stage. This is consistent with the XRD results that the $MnO_2$ synthesized at room temperature had a shorter fiber length.

It was also observed that interparticle voids formed among $MnO_2$ spikes were about 50 Å to about 300 Å in width. This is consistent with pore size distribution results.

Spray drying technology was used to reconstitute the $MnO_2$ nanofibres to obtain particle sizes of about 250 microns. The process included the following steps:

(1) Dispersion of as-synthesized $MnO_2$ nanofibers into deionized water (2) Addition of a PVA binder, about 2 wt. %

(3) Spray drying to form agglomerates (4) Post heat treatment to removal unwanted species The spray drying process was performed using a 16 ft. industrial spray drier. This equipment is capable of processing 100 lbs. of materials per hour. The size, shape, and density of the reconstituted powders are a function of slurry feeding rate, drying temperature, powder outlet temperature, and atomization gas rate. After spray drying, the powders were sieved.

Figure 5:
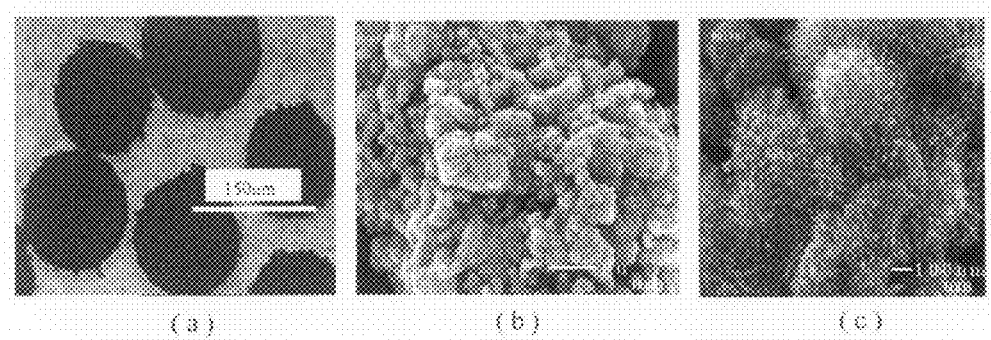
FIG. 5 illustrates (a) an optical microscope image of reconstituted $MnO_2$ particles having a particle size greater than 150 micrometers as well as (b) and (c) SEM images of reconstituted nanofibrous $MnO_2$ particles.

Optical and scanning electronic microscope images of the reconstituted $MnO_2$ particles are shown in FIG. 5. The optical microscope image in FIG. 5(a) shows that the reconstituted $MnO_2$ particles were substantially spherical with diameters of greater than or equal to about 150 microns. The SEM image of the reconstituted nanofibrous $MnO_2$ particles in FIG. 5(b) shows that each sphere comprises hundreds of agglomerated particles having a size range from submicrons to a few microns. An increase in magnification, as shown in the SEM image of 5(c), shows that each agglomerate comprises a plurality of spiked balls of $MnO_2$, with macropores among the bundles and mesopores among the spikes.

Example 2

Evaluation of $MnO_2$ for Water Treatment

In this example, the $MnO_2$ nanofibers synthesized according to Example 1 were evaluated for their efficiencies in oxidizing As(III) to As(V) in comparison with a commercially available product. The comparisons were made using rapid small scale column tests (RSSCTs) under a variety of experimental conditions. Using adsorption isotherm tests, $MnO_2$ nanofibers were also evaluated for their performance in removing As(V) and Pb(II) from drinking water.

For all evaluation experiments, a so-called "challenge water" of the composition described in Table 2 was used. It has the same anionic composition as the National Sanitation Foundation (NSF) International Standard 53 Challenge Water used for evaluation of point-of-use devices for arsenic removal. Its calcium and magnesium concentrations were lowered to give the water greater long-term stability, as the NSF water is stable only for about 24 to about 48 hours, whereas the isotherm tests described herein were conducted for greater than or equal to about 48 hours. The following reagent grade salts were used to prepare the challenge water: $NaNO_3$, $NaHCO_3$, $Na_2HPO_4 \cdot H_2O$, NaF, $Na_2SiO_3 \cdot 9H_2O$, $MgSO_4 \cdot 7H_2O$, and $CaCl_2 \cdot 2H_2O$. Interfering $Fe^{2+}$ ions in As(III) oxidation tests were introduced from ferrous ammonium sulfate (EM Science). $Mn^{2+}$ and $S^{2-}$ were prepared from $MnSO_4 \cdot H_2O$, and $Na_2S \cdot 9H_2O$, respectively.

TABLE 2

Composition of the Challenge Water

| Cations | meq/L | mg/L | Anions | meq/L | mg/L |
|---|---|---|---|---|---|
| $Na^+$ | 3.604 | 82.9 | $HCO_3^-$ | 2.0 | 122.0 |
| $Ca^{2+}$ | 0.36 | 7.21 | $SO_4^{2-}$ | 1.0 | 48.0 |
| $Mg^{2+}$ | 0.26 | 3.16 | $Cl^-$ | 0.36 | 12.8 |
| | | | $NO_3^-$—N | 0.143 | 2.0 |
| | | | $F^-$ | 0.053 | 1.0 |
| | | | $PO_4^{3-}$—P | 0.0013 | 0.04 |
| | | | Silicate as $SiO_2$ | 0.66 | 20.0 |
| Total | 4.224 | 93.27 | | 4.224 | 205.8 |

Estimated total dissolved solids (TDS) by evaporation = 287 mg/L.
meq/L = milliequivalents per liter
mg/L = milligrams per liter Both low and high levels of dissolved oxygen (DO) were used in the challenge water during As(III) oxidation tests. Low-DO, i.e., less than about 80 parts per billion (ppb) $O_2$, challenge water was prepared by sparging the challenge water with $N_2$ for 1.5 hours. High-DO challenge water was prepared by sparging water with air for 15 minutes to a dissolved oxygen saturation concentration of approximately 8.3 mg/L. As(III) was spiked into the challenge water, and then freshly prepared $Fe^{2+}$, $Mn^{2+}$, or $S^{2-}$ solutions were spiked. During the experiments, the pH of the challenge water was adjusted to a range of about 6.5 to 8.5 by using dilute HCl and NaOH solutions.

For the As(III) oxidation tests, RSSCTs were used to evaluate $MnO_2$ nanofibers for their efficiency in oxidizing As(III) to As(V). The tests were conducted under a variety of experimental conditions including variable pH, empty bed contact time (EBCT), low/high dissolved oxygen (DO), and the absence or presence of interfering reductants ($Fe^{2+}$, $Mn^{2+}$, or $S^{2-}$).

It is noted here that $MnO_2$ nanofibers were not directly used in the column test, because of their small particle size (about 10 μm), which would have given an extremely high pressure drop in a packed bed. To achieve reasonable RSSCT flow rates, the $MnO_2$ nanofibers were granulized by the spray-drying technique described in Example 1 to form larger, but porous particles. Granulized, porous $MnO_2$ particles (having diameters of about 125 to about 180 microns (μm) were loaded into a 1 centimeter inner diameter glass column with total volume of 1.0 mL. The column was then backwashed with deionized water to remove fines.

The As(III) oxidation tests were conducted by pumping the Low-DO challenge water containing As(III) through the column at a controlled flow rate. To speciate the effluent, 10-mL samples of the effluent from the RSSCT were collected and preserved with EDTA-HAc. As(III) concentration in the effluent was analyzed by hydride-generation atomic absorption spectrophotometry (HG-AAS).

For the As(V) and Pb(II) adsorption isotherm testes, a 2-day wet-slurry isotherm procedure was used for adsorption isotherm tests. First, adsorbents were screened with a set of 200 and 325 mesh sieves. Powder that was trapped between these two sieves, i.e., having a particle size between about 45 to about 75 μm, was used to make a suspension with a powder content of 1.00 g/L. The suspension was vigorously stirred to keep powders suspended. Predetermined aliquots of the vigorously stirred suspension were pipetted into 150-mL bottles to yield appropriate adsorbent concentrations for the equilibrium adsorption tests. Then, 100-mL aliquots of As(V) or Pb(II) spiked synthetic water was added to each bottle. Adsorbent media dosages that were tested were: 0, 0.25, 0.5, 1, 2, and 5 mg $MnO_2$ in every 100 mL As(V) or Pb(II) spiked synthetic water. The dosed bottles and the blank (no adsorbent) were placed in a covered wooden box and rotated at 15 revolutions per minute (rpm) for 2 days at ambient temperature (about 23° C.) to reach adsorption equilibration. It was determined that a reasonable approach to equilibrium was reached in 48 hours. After the equilibration, a 10-mL water sample was collected from each bottle and microfiltered with a 0.2 μm filter disc to remove all suspended particles (adsorbent media). The water samples were preserved with concentrated $HNO_3$ prior to analysis. The acid concentration in the water sample was about 1% (v/v). For As(V) adsorption isotherm tests, the challenge water was spiked with 200 μg/L As(V). Arsenic concentrations in the preserved water samples were also measured by HGAAS. The mass of arsenic adsorbed onto the media was determined from the difference in soluble arsenic concentrations in the equilibrated samples and the blank (no adsorbent). For Pb(II) adsorption isotherm tests, the challenge water was spiked with 500 μg/L Pb(II), and the Pb(II) concentrations in the preserved water samples were measured by inductively coupled plasma mass spectrometry (ICP-MS). The mass of lead adsorbed onto the media was determined from the difference in soluble lead concentrations in the equilibrated samples and the blank (no adsorbent).

The arsenic analysis was performed using a Perkin-Elmer (Model Zeeman 5000) atomic absorption spectrometer (AAS) coupled with a Perkin-Elmer FIAS-100 unit for hydride generation for the determinations of As(III) and As(total). The arsenic lamp was an electrodeless discharge lamp (EDL) operated at 8 Watts (W) from an external power supply. To determine total arsenic, water samples were treated with L-cysteine in a 2 moles per liter (Molar) HCl solution to reduce As(V) to As(III) which was determined by the HGAAS. For the determination of As(III) in the presence of As(V), the carrier HCl solution was replaced by a 2 Molar (M) citric/citrate buffer solution at a pH of about 5.0. Arsine ($AsH_3$) was generated using 0.2 wt. % sodium tetrahydroborate in 0.05 wt. % NaOH. Under these conditions, As(V) was not converted to $AsH_3$ and did not interfere in the determination of As(III). As(V) was calculated from the difference between As(total) and As(III). The detection limit (DL) was 0.04 μg/L for As(total) and 0.096 μg/L for As(III).

Short-term As(III) oxidation tests at high-DO were conducted to compare the efficiency of a commercially available $MnO_2$ known as FILOX-R with that of nanoporous $MnO_2$ by oxidizing As(III) to As(V) at three different EBCTs (2.0, 1.0, and 0.50 minutes) and at two pHs (8.3 and 6.5). Both FILOX-R and naofibrous $MnO_2$ granules completely oxidized As(III) to As(V). No distinguishable performance was observed under these test conditions.

In the short-term, low-DO experiments, the EBCT was further reduced to about 0.125 minutes to differentiate the oxidizing efficiencies of both media. Table 3 compares the performances of FILOX-R and granulated nanofibrous $MnO_2$ media at different EBCTs for low-DO challenge water without any interfering reductant at pH 8.3 and 7.5. Up to about 0.25 minutes EBCT there was no significant difference in oxidizing performance between the two media, but there was a clear difference in the As(III) oxidation rate at an EBCT of 0.125 minutes. Granulated nanofibrous $MnO_2$ media was more effective than FILOX-R for rapid oxidation of As(III) to As(V). Both media showed better performance at a higher pH than at a lower pH; at both pH's the oxidizing efficiency of granulated nanofibrous $MnO_2$ media was better than FILOX-R.

Based on the short-term experiments at low and high-DO, it could be concluded that DO had no significant effect on oxidizing efficiency up to EBCT 0.5 minutes for both media.

TABLE 3

As(III) oxidation performance of FILOX-R and Inframat media at low-DO

| Challenge | | Percent oxidation of As(III) | |
|---|---|---|---|
| Water pH | EBCT | FILOX-R | $MnO_2$ Granules |
| 8.3 | 0.5 | 100 | 100 |
|  | 0.25 | 98 | 100 |
|  | 0.125 | 79 | 94 |
| 7.5 | 0.125 | 71 | 75 |

Long term experiments with interfering reductants were carried out. To study the effects of the interfering reductants, except sulfide, on the oxidation performance, a run length of more than 2100 bed volumes (BV) was considered. In the presence of sulfide, arsenic sulfides along with many water-soluble thioarsenite species are formed, and accurate differentiation between As(III) and As(V) cannot be made. The availability of the free As(III) decreased with time. So, in the presence of sulfide, only short-term experiments were conducted to observe the effects of sulfide on oxidizing efficiency of the granulated nanoporous material and FILOX-R.

Figure 6:
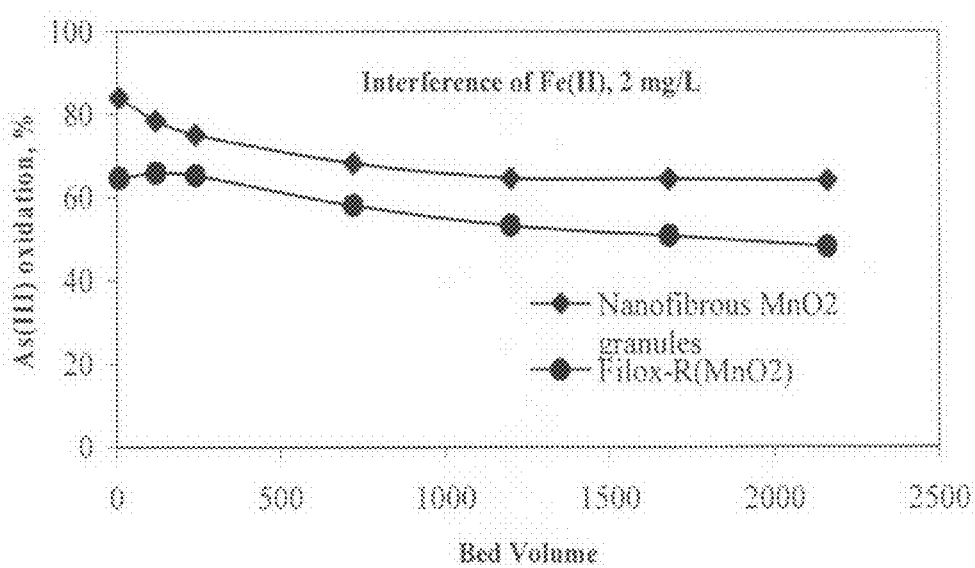
FIG. 6 graphically illustrates the As(III) oxidation in low dissolved oxygen challenge water at a pH of about 7.5 with Fe(II) as an interfering reductant.

When 2.0 mg/L Fe(II), as an interfering reductant, was present in the feed, As(III) oxidation was reduced for a short period of time for nanofibrous $MnO_2$ granules, and then the efficiency decreased slowly to about 1200 BV. After about 1200 BV, the oxidative ability was substantially constant. With FILOX-R, initially up to about 240 BV, Fe(II) had no effect on As(III) oxidation, but after about 240 BV, the oxidative efficiency decreased gradually up to about 2160 BV. These results, which are shown in FIG. 6 for a pH of about 7.5 and an EBCT of 0.125 minutes, clearly indicated that nanofibrous $MnO_2$ outperformed FILOX-R in the presence of Fe(II).

Figure 7:
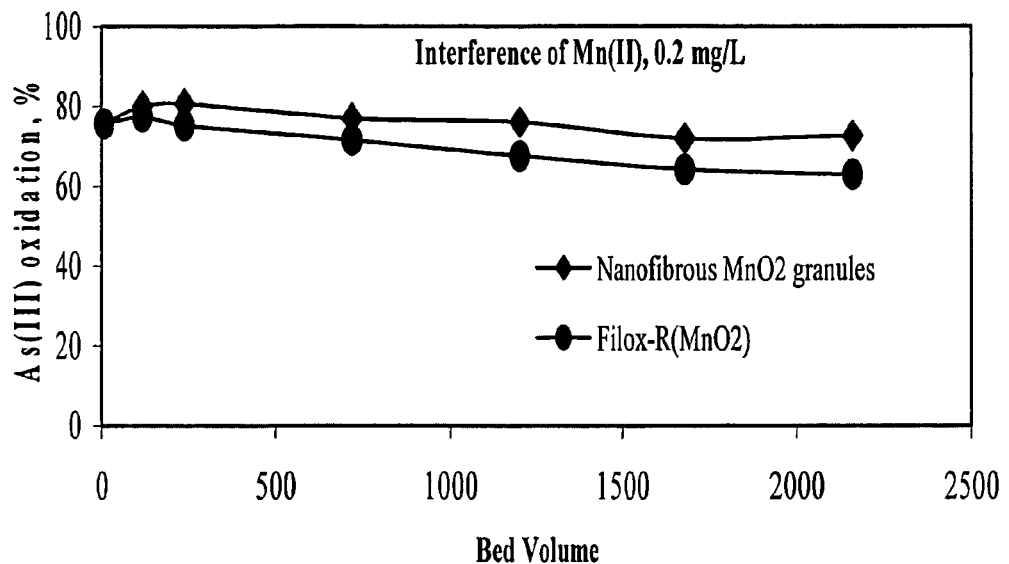
FIG. 7 graphically illustrates the As(III) oxidation in low dissolved oxygen challenge water at a pH of about 7.5 with Mn(II) as an interfering reductant.

The effect of 0.2 mg/L Mn(II) as an interfering reductant on both media's As(III) oxidation efficiency was studied at a pH of about 7.5 and an EBCT of 0.125 minutes. The results are shown in FIG. 7. As indicated by FIG. 7, initially up to about 120 BV, the oxidation efficiencies of the nanofibrous $MnO_2$ granules and FILOX-R increased slightly and then decreased slightly with increasing BV treated. The experimental results indicate a slight advantage for nanofibrous $MnO_2$ compared with FILOX-R.

When both As(III) and sulfide are present in anoxic water insoluble sulfides and soluble sulfide, complexes are formed. It has previously been determined that under anoxic conditions in the presence of sulfide, As(III) forms insoluble $As_2S_3$ and soluble thioarsenite species, depending on the pH of the solution and the concentrations of As(III) and $S^2$. Therefore, in waters containing sulfide and As(III), colloidal and anionic forms of As(III) are expected, which render the current As(III)/(V) speciation methods inapplicable. Oxidation of As(III) to As(V) cannot be accurately determined in these waters using the EDTA-HAc preservation speciation method that was used for the As(III) oxidation studies in the absence of sulfide. Thus, the differential-pH hydride generation speciation method was employed to overcome the analytical problem with As(III/V) preservation-speciation in the presence of sulfide.

Figure 8:
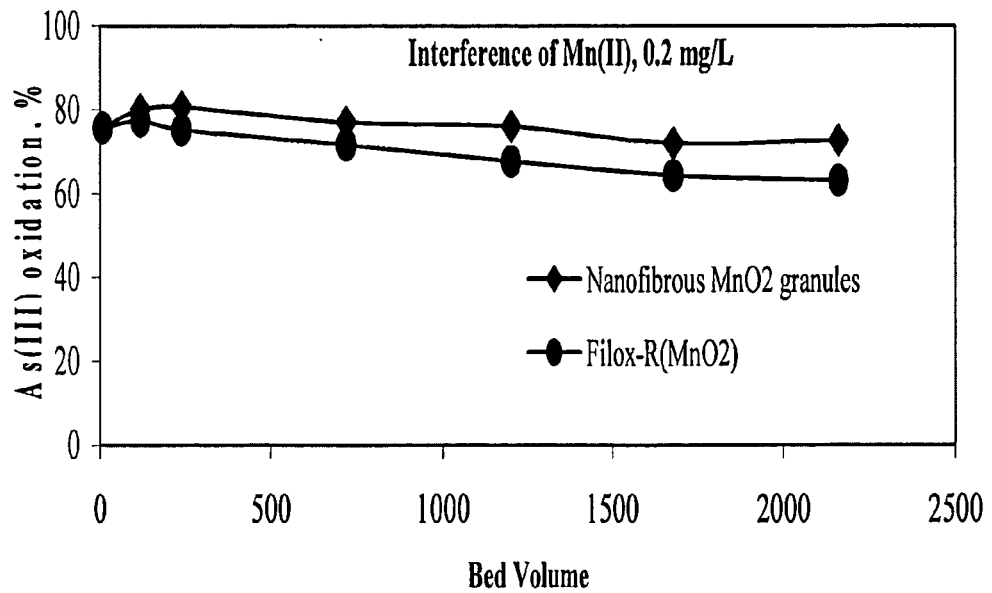
FIG. 8 graphically illustrates the As(III) oxidation in low dissolved oxygen challenge water at a pH of about 7.5 with sulfide as an interfering reductant.

The oxidation efficiencies of the nanoporous $MnO_2$ and FILOX-R were calculated at specified time intervals and compared in FIG. 8 for 2.0 mg/L sulfide, a pH of about 7.5, and an EBCT of about 0.125 minutes. The results indicated that in both cases the oxidation efficiencies decreased with increasing BV. The results also indicated that in the presence of sulfide, FILOX-R slightly outperformed the nanofibrous $MnO_2$ granules.

Figure 9:
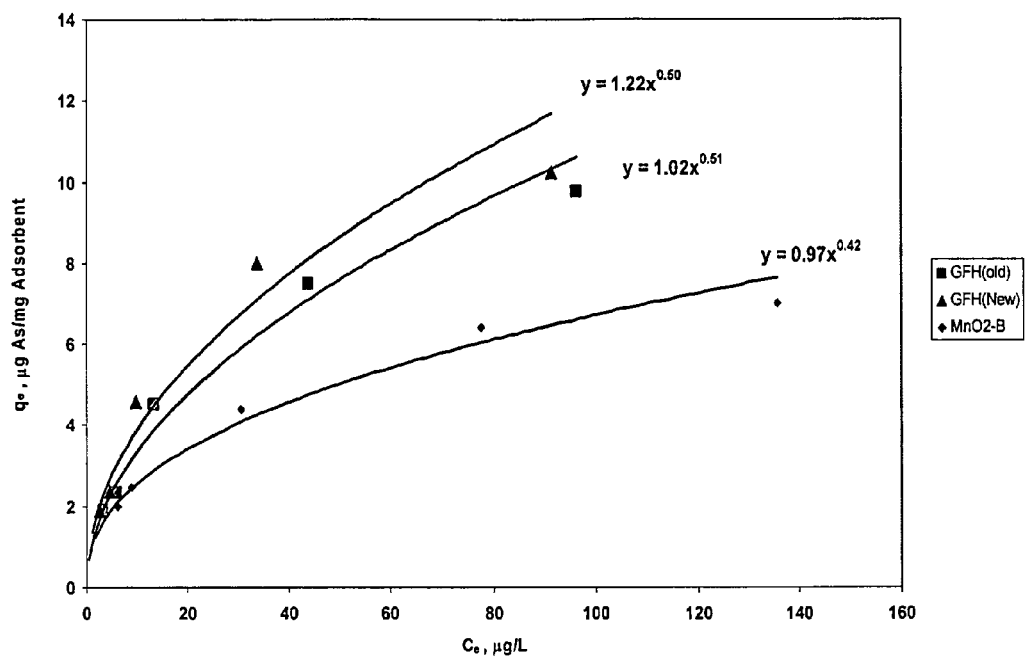
FIG. 9 graphically illustrates that $MnO_2$ also possesses significant adsorption capacity for As(V)

The ability of $MnO_2$ to adsorb As(V) from the challenge water was evaluated using batch isotherm tests. As(V) adsorption isotherms of $MnO_2$ are shown in FIG. 9 for both the nanoporous $MnO_2$ and a commercially available iron-based arsenic adsorbent, GFH. As can be seen from the data of FIG. 9, more arsenic was removed when a higher dosage of the adsorbent was added, resulting in a lower residual (equilibrium) arsenic concentration. Adsorption capacity was calculated by dividing arsenic concentration difference before and after adsorption equilibrium by the amount of adsorbent added. After developing the isotherms, the data were fitted to the Freundlich equation (2):

$$q_e = K C_e^{1/n}, \text{where} \tag{2}$$

K=Freundlich constant indicative of adsorption capacity of adsorbent (L/μg);
$C_e$=Equilibrium concentration (μg/L);
$q_e$=Mass of arsenic adsorbed per mass of the adsorbent (mg/g); and
n=Experimental constant indicative of adsorption intensity of the adsorbent The As(V) adsorption capacity of $MnO_2$ was substantial, although not as high as GFH. $MnO_2$ was a good oxidant for As(III) to As(V) but was not expected to have good As(V) adsorption capacity. The unusually high As(V) adsorption capacity that was found for the $MnO_2$ nanofibers is believed to be related to its high surface area.

Figure 10:
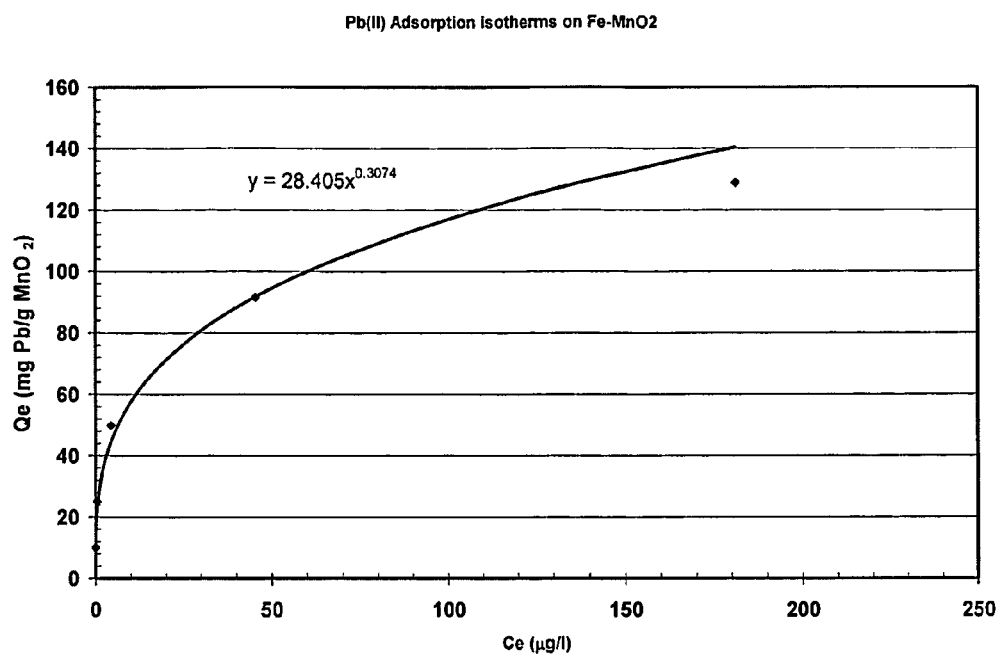
FIG. 10 graphically illustrates an adsorption isotherm for Pb(II) on $MnO_2$.

Finally, the ability of $MnO_2$ to adsorb Pb(II) from the challenge water was evaluated using batch isotherms tests. The Pb(II) adsorption isotherm for nanofibrous $MnO_2$ is shown in FIG. 10. This material possessed a much higher adsorption capacity for Pb(II) (90 μg/g at 50 μg/L Pb(II)) compared to As(V) (4.5 μg/g at 50 mg/L As(V)). The fact that $MnO_2$-based media adsorbs more Pb(II) than As(V) is expected because of the low point of zero charge (PZC) of $MnO_2$. The PZC of $MnO_2$ is near a pH of 3.0. When $MnO_2$ was soaked in an aqueous solution, it developed a negatively charged surface, which beneficially adsorbs positively charged species in water, such as Pb(II).

From the experiments in this example, it was concluded that the nanofibrous $MnO_2$ not only possessed a high efficiency in converting As(III) to As(V), but also a relatively high adsorption capacity for As(V) and Pb(II).

Example 3

Iron Oxide Synthesis and Characterization $Fe_2O_3$ was synthesized by preheating 100 mL water in a beaker to about 90° C. A 6M NaOH solution and 100 mL of a 2M $Fe(NO_3)_3$ solution were co-precipitated into the hot water while it was continuously heated and stirred. The pH of the precipitate was controlled at about 7.5. The precipitate was continuously refluxed at about 90° C. for 6 hours. The precipitate was then filtered, washed with water, and dried in an oven at about 100° C. The dried material was ground into a powder for further testing.

Figure 11:
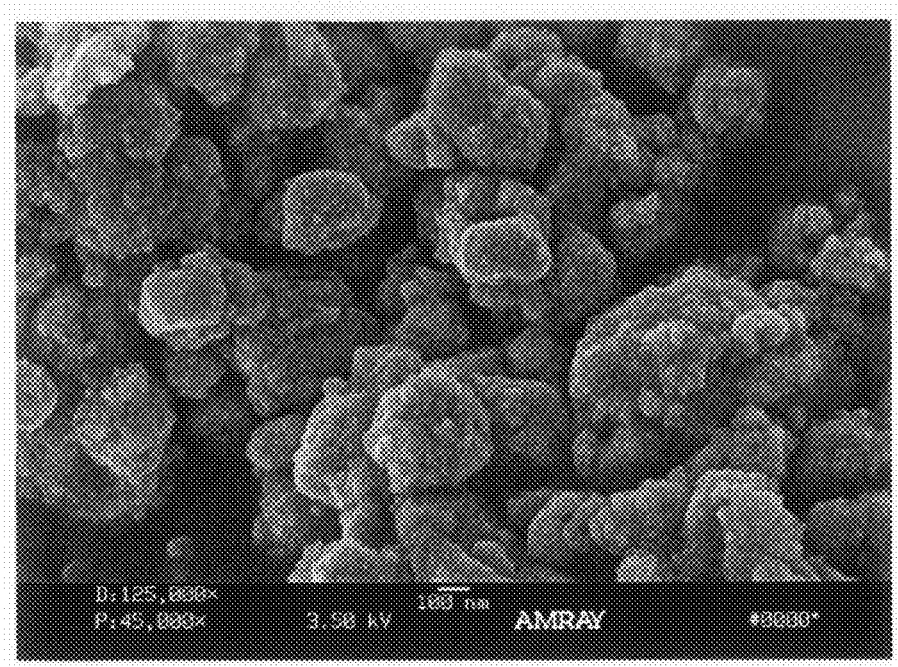
FIG. 11 is a SEM image of a nanostructured $Fe_2O_3$ sample.

The SSA and pore analysis of this material was conducted using the BET method as described in Example 1. The SSA of this material was about 154 $m^2/g$, and the total pore volume was about 0.21 $cm^3/g$. XRD analysis revealed that this material possessed the $\alpha$-$Fe_2O_3$ structure. The PZC of this material was at a pH of about 8.4. FIG. 11 is a SEM image, which shows agglomerates of about 100 to about 1000 nm, comprising $Fe_2O_3$ particles having an average size of about 20 nm.

Example 4

Doped Iron Oxide and Doped Manganese Oxide Synthesis and Characterization

Figure 12:
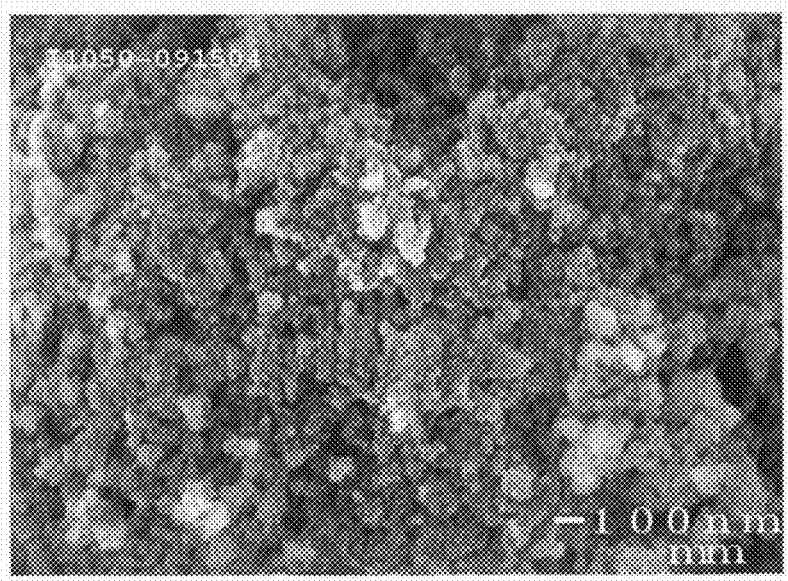
FIG. 12 is a SEM image of a nanostructured Mn-doped $Fe_2O_3$ sample.

A Mn-doped $Fe_2O_3$ was made following the process of Example 3 except that 8.73 g $MnSO_4\cdot H_2O$ was dissolved into 30 mL water and was mixed with 100 mL of the 2M $Fe(NO_3)_3$ solution before the precipitation was conducted. Doping dramatically changed the material's properties. The SSA of this material was about 259 $m^2/g$ and the total pore volume was about 0.48 $cm^3/g$. XRD analysis revealed that this material had the structure of a ferrihydrate. The PZC of this material was at a pH of about 7.1. FIG. 12 is a SEM image, which shows smaller agglomerates, comprising the Mn-doped $Fe_2O_3$ particles having an average size of about 20 nm. The smaller agglomerate size is in agreement with the higher total pore volume.

Figure 13:
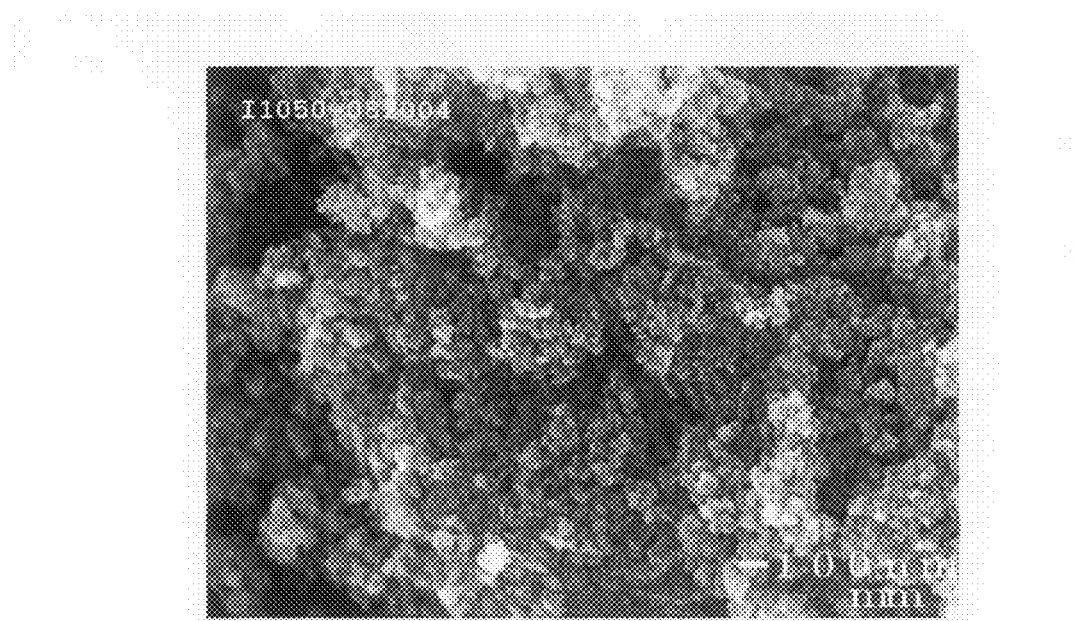
FIG. 13 is a SEM image of a nanostructured La-doped $Fe_2O_3$ sample.

A La-doped $Fe_2O_3$ was made following the process of Example 3 except that $LaCl_3$ was dissolved in water and was mixed with 100 mL of the 2M $Fe(NO_3)_3$ solution before the precipitation was conducted. The SSA of this material was about 174 $m^2/g$ and the total pore volume was about 0.41 $cm^3/g$. XRD analysis revealed that this material had the structure of hematite. The PZC of this material was at a pH of about 8.8. FIG. 12 is a SEM image, which shows smaller agglomerates, comprising $Fe_2O_3$ particles having an average size of about 20 nm. FIG. 13 is a SEM image of the La-doped $Fe_2O_3$. Similar to the Mn-doped $Fe_2O_3$ sample, the agglomerates are significantly smaller than those of the undoped $Fe_2O_3$ sample. The average particle size is about 20 nm.

A Fe-doped $MnO_2$ was made following the process of Example 1, with the exception that $Fe(NO_3)_3$ was used as a precursor and was added simultaneously into a beaker containing hot water with the $MnSO_4$ and the $KMnO_4$. The SSA of this material was about 503 $m^2/g$ and the total pore volume was about 0.44 $cm^3/g$. XRD analysis revealed that doping reduced the crystallinity of the $MnO_2$ structure. The PZC of this material was at a pH greater than 3.0, which is the PZC pH for the undoped $MnO_2$ of Example 1.

Example 5

Iron- and Manganese-based Nanocomposite Water Treatment Media

Various composites were prepared using the iron oxides and manganese oxides (both undoped and doped) described herein. The general procedure included dispersing about 1600 g of an iron oxide composition (doped or undoped) in 1 L water. Next, about 400 g of a nanofibrous manganese oxide composition (doped or undoped) were added into the iron oxide suspension and mixed using a high power mechanical stirrer. About 2 wt. % of a binder by weight of the total slurry was added and mixed. The slurry was spray dried to form nanocomposite granules having a particle size up to 425 μm. Most of the particles were in the size range of 75 to 150 μm. Table 4 lists physical characteristics of the nanocomposite granules. The nanocomposite granules contained 80 wt. % of $Fe_2O_3$ and 20 wt. % of $MnO_2$ based on the total weight of the granule.

TABLE 4

Physical characteristics of the $Fe_2O_3$—$MnO_2$ nanocomposite granules

| Sample | SSA ($m^2/g$) | Porosity (%) | Tap Density (g/ml) | Point of Zero Charge (PZC) |
|---|---|---|---|---|
| $Fe_2O_3$—$MnO_2$ granule | 242 | 67 | 0.51 | 6.48 |

As can be seen from the data in Table 4, the $Fe_2O_3$—$MnO_2$ granules possessed a very high surface area and are highly porous. These properties are beneficial to the media's adsorption capacity and kinetics.

RSSCTs were carried out on a variety of samples. The first experiment studied the oxidation and adsorption efficiency of As(III) using composite $Fe_2O_3$—$MnO_2$ (Sample No. 072105-B) media at a pH of 7.5. The second experiment determined the breakthrough of As(V) using $Fe_2O_3$—$MnO_2$ (072105-B) media at pHs of 6.5, 7.5, and 8.5, and this was then compared with the As(V) breakthrough of the commercially available benchmark, GFH. The third experiment determined the breakthrough of As(V) using Mn-doped $Fe_2O_3$ (072105-A) media at a pH of 7.5.

For these RSSCTs, a 1 cm inner diameter glass column containing 4 $cm^3$ of the media (60×40 mesh), which was carefully loaded into the column, was used. Similar glass columns were prepared for GFH. A peristaltic pump was used to pump the feed solution through the columns at a flow rate of about 8 mL/min (EBCT of about 0.5 min). Arsenic-containing challenge water was analyzed for total arsenic or As(III) in the effluent and feed solutions. All samples were preserved with concentrated $HNO_3$ (1 mL/L) or EDTA-acetic acid (1.34 mM EDTA and 87 mM acetic acid) when speciated. RSSCTs were conducted at different pHs using As(V) and As(III). Table 5 presents the experimental conditions for the RSSCTs.

TABLE 5

Experimental conditions for RSSCTs for arsenic.

| Expt. no | pH | As in feed soln | EBCT (min) | Media |
|---|---|---|---|---|
| 1 | 7.5 | As(III) | 0.5 | $Fe_2O_3$—$MnO_2$ (072105-B) |
| 2 | 6.5 | As(V) | 0.5 | $Fe_2O_3$—$MnO_2$ (072105-B) and GFH |
| 3 | 7.5 | As(V) | 0.5 | $Fe_2O_3$—$MnO_2$ (072105-B) and GFH |
| 4 | 8.5 | As(V) | 0.5 | $Fe_2O_3$—$MnO_2$ (072105-B) and GFH |
| 5 | 6.5 | As(V) | 0.5 | GFH |
| 6 | 7.5 | As(V) | 0.5 | GFH |
| 7 | 8.5 | As(V) | 0.5 | GFH |
| 8 | 7.5 | As(V) | 0.5 | $Fe_2O_3$ (072105-A) |

Figure 15:
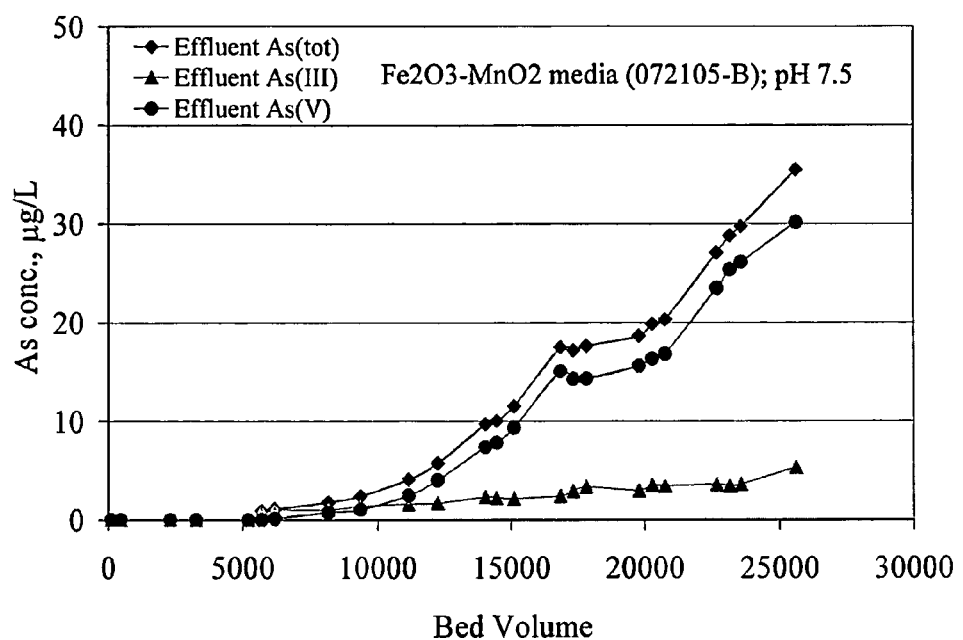
FIG. 15 graphically illustrates the breakthrough curves of total arsenic, As(III), and As(V) using a composite $Fe_2O_3$—$MnO_2$ media at a pH of about 7.5.

RSSCTs were conducted to study the oxidation of As(III) and adsorption of arsenic using the composite $Fe_2O_3$—$MnO_2$ (072105-B) media at a pH of about 7.5 at an EBCT of about 0.5 minutes. The arsenic breakthrough curves of the RSSCTs are shown in FIG. 15, which indicates that at a pH of 7.5, the composite material significantly oxidized As(III). As(III) concentrations in the effluent were measured after preservation with EDTA-HA, followed by differential pH HG-AAS. At about 25,000 BV the concentration of As(III) in the effluent was about 5 µg/L. The difference between As(Tot) and As(III) was also measured in the effluent. The As(Tot) and As(V) breakthroughs at 10 µg/L using the composite $Fe_2O_3$—$MnO^2$ media at a pH of about 7.5 were about 14500 and about 15300 BV, respectively. From this study, it was concluded that the composite $Fe_2O_3$—$MnO_2$ media was very efficient for As(III) oxidation and As(V) adsorption. In Example 2, it was shown that the $MnO_2$ media efficiently oxidized As(III). This composite material contained the $MnO_2$ of Example 2, which efficiently oxidized As(III) and $Fe_2O_3$ and efficiently adsorbed As(V).

Figure 14:
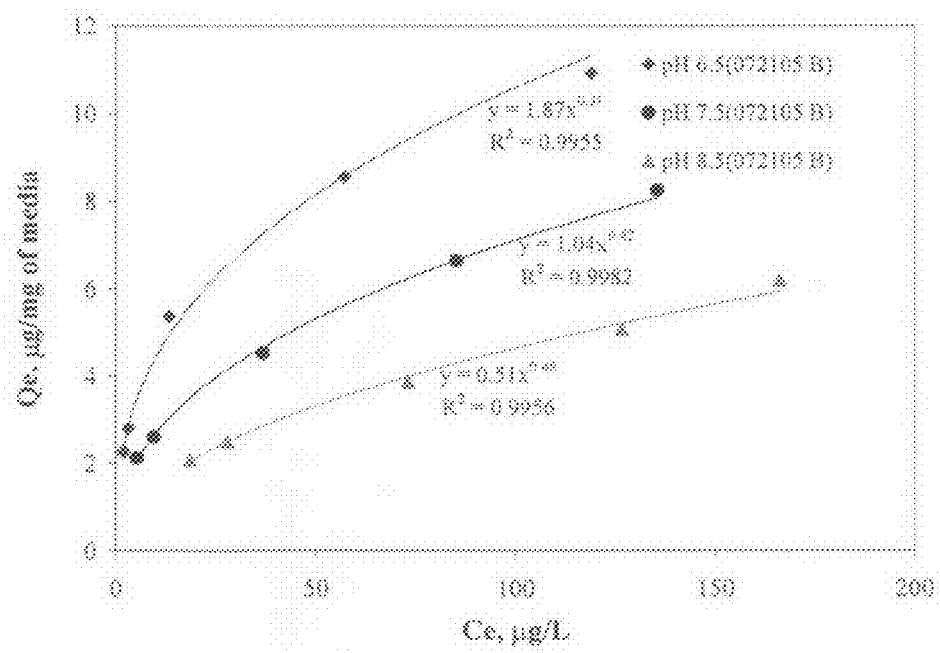
FIG. 14 graphically illustrates As(V) adsorption isotherms for a composite $Fe_2O_3$—$MnO_2$ media at various pHs.
Figure 16:
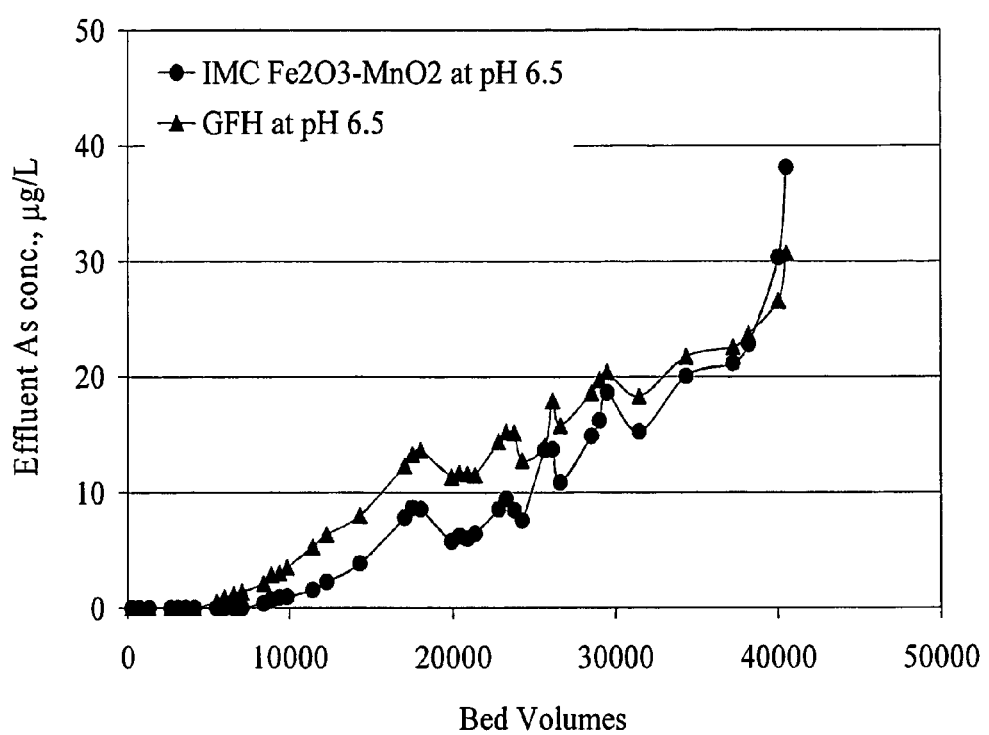
FIG. 16 graphically illustrates the breakthrough curves of As(V) for a composite $Fe_2O_3$—$MnO_2$ media and GFH at a pH of about 6.5.
Figure 17:
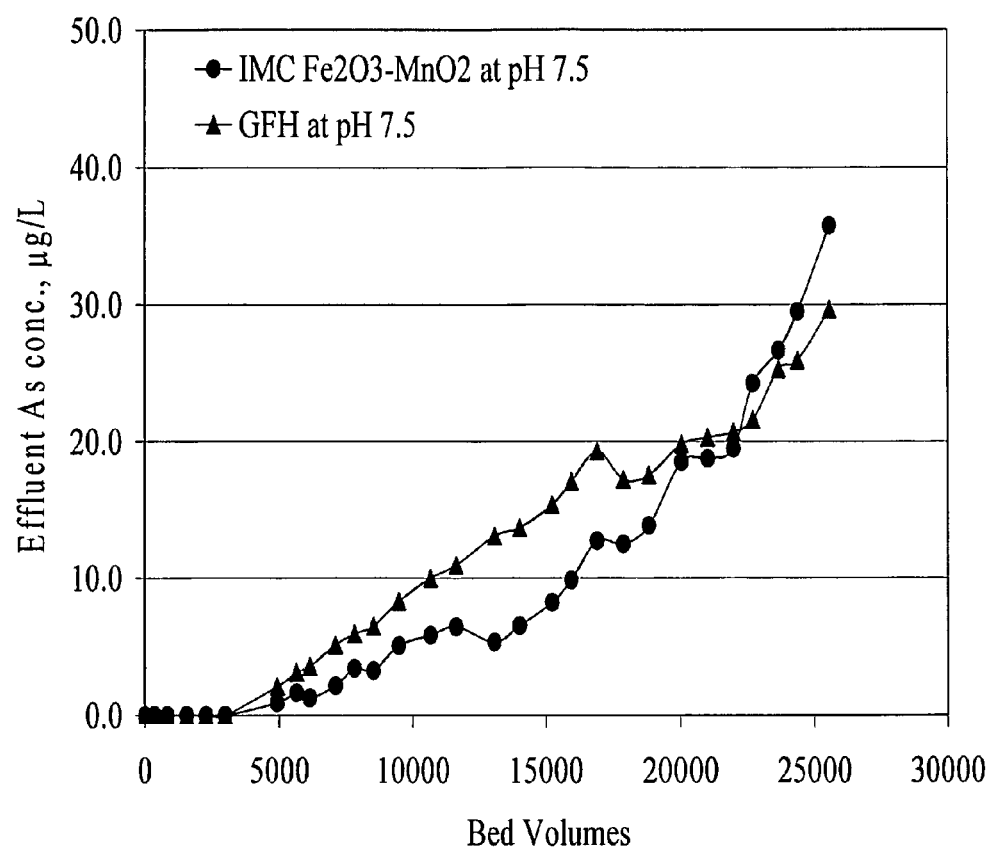
FIG. 17 graphically illustrates the breakthrough curves of As(V) for a composite $Fe_2O_3$—$MnO_2$ media and GFH at a pH of about 7.5.
Figure 18:
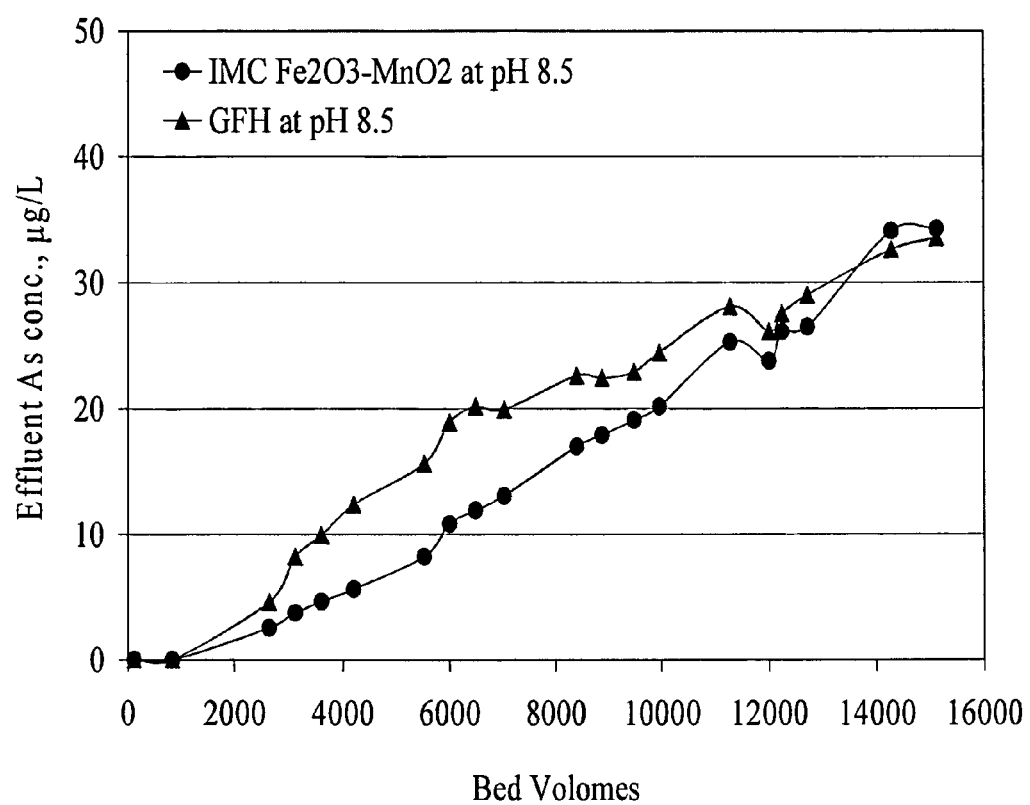
FIG. 18 graphically illustrates the breakthrough curves of As(V) for a composite $Fe_2O_3$—$MnO_2$ media and GFH at a pH of about 8.5.

Next, RSSCTs were conducted using composite $Fe_2O_3$—$MnO_2$ (072105-B) media and GFH at three different pHs at an EBCT of 0.5 min (Experiments 2-7 in Table 4). Fifty parts per billion (µg/L) As(V) was used in all experiments to evaluate the effectiveness of the composite media and the GFH. The As(V) adsorption isotherms for the composite $Fe_2O_3$—$MnO_2$ (072105-B) media at pHs of about 6.5, about 7.5, and about 8.5 are shown in FIG. 14. The arsenic breakthrough curves of the column runs are shown in FIGS. 16, 17, and 18, for pHs of about 6.5, about 7.5, and about 8.5, respectively. The data indicated that the arsenic breakthrough curves were pH dependent, and at all three pHs, the composite $Fe_2O_3$—$MnO_2$ material significantly outperformed the GFH at 10 µg/L As(V) breakthrough. At a pH of about 6.5, both media performed better than at the higher pHs. The As(V) breakthroughs at pHs of about 6.5, about 7.5, and about 8.5 for the composite $Fe_2O_3$—$MnO_2$ media were about 25300, about 16200, and about 9900 BV, respectively. In contrast, for GFH, the As(V) breakthrough values at 10 µg/L were about 15800, about 10800, and about 6400 BV, respectively. From this data, it was concluded that the composite $Fe_2O_3$—$MnO_2$ (072105-B) media performed significantly better than the commercially available GFH media.

Figure 19:
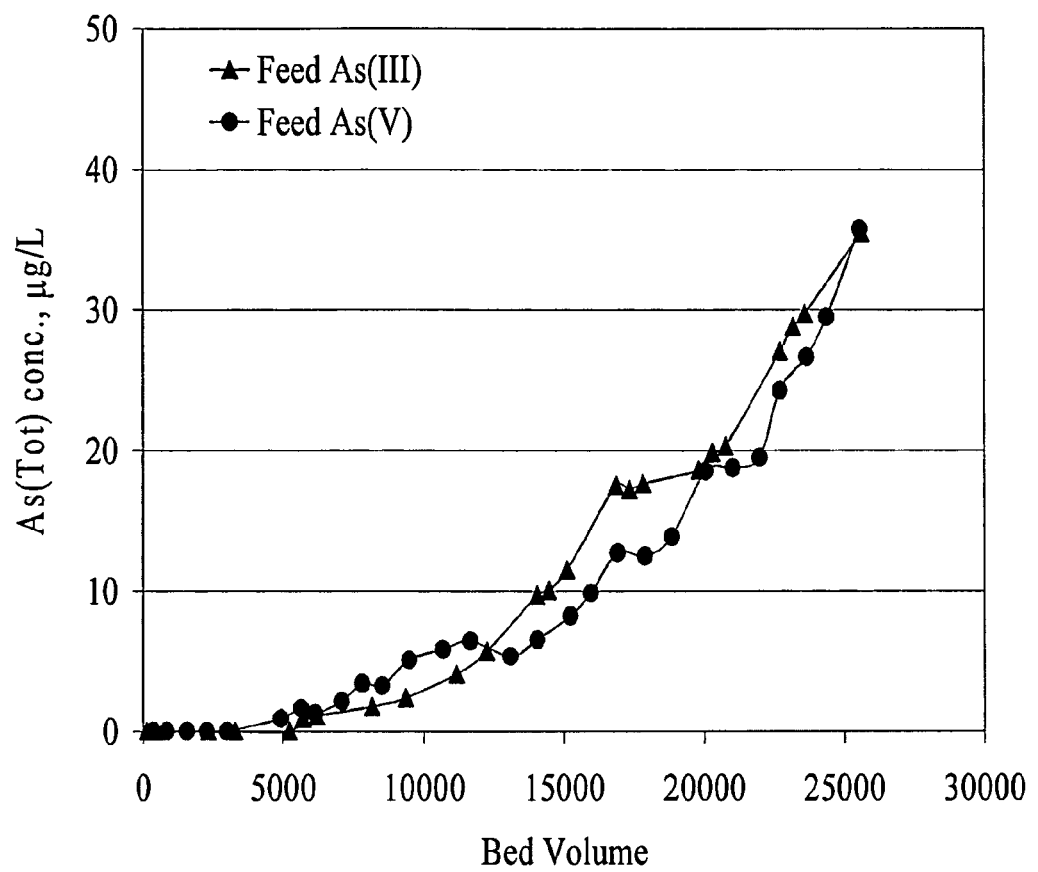
FIG. 19 graphically illustrates the breakthrough curves of As(III) and As(V) for a composite $Fe_2O_3$—$MnO_2$ media at a pH of about 7.5.

It has been documented that As(V) is more efficiently removed than As(III). Thus, it is important to compare the arsenic removal efficiency of the composite $Fe_2O_3$—$MnO_2$ (072105-B) media for a pure As(V) feed compared with a pure As(III) feed. FIG. 19 illustrates the breakthrough curves at a pH of about 7.5 with an EBCT of about 0.5 minutes for both As(III) and As(V). FIG. 19 indicates that the composite material was almost equally efficient in removing As(III) and As(V). This means that when pure As(III) was fed into the column, the composite $Fe_2O_3$—$MnO_2$ media was doing an excellent job of oxidizing As(III) to As(V) prior to adsorption of the As(V). An advantageous feature of the composite media was that there was no need for a pre-oxidation step when arsenic was present as As(III) in the water. Advantageously, this will result in a reduction in the amount of byproducts that are generated during the pretreatment process.

Figure 20:
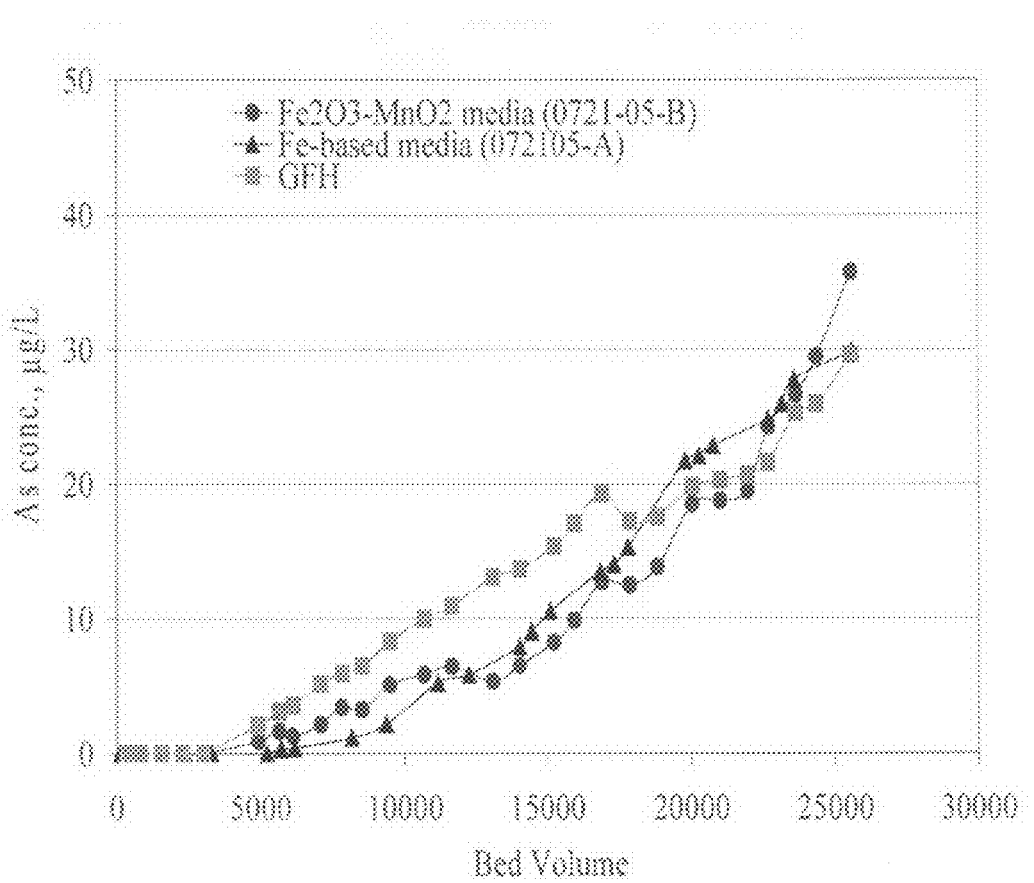
FIG. 20 graphically illustrates the breakthrough curves of As(V) for a composite $Fe_2O_3$—$MnO_2$ media, $Fe_2O_3$, and GFH at a pH of about 7.5.

The Fe-based media produced in Examples 3 and 4 were also used to study the removal efficiency of arsenic. RSSCTs were conducted using an Fe-based media (072105-A) at a pH of about 7.5 at an EBCT of about 0.5 minutes and compared with the composite $Fe_2O_3$—$MnO_2$ media (070521-B) and GFH. The results are shown in FIG. 20, which indicate that Fe-based media (072105-A) alone performed significantly better than the GFH. Furthermore, the Fe-based media alone also performed similar to the composite $Fe_2O_3$—$MnO_2$ media (070521-B).

Figure 21:
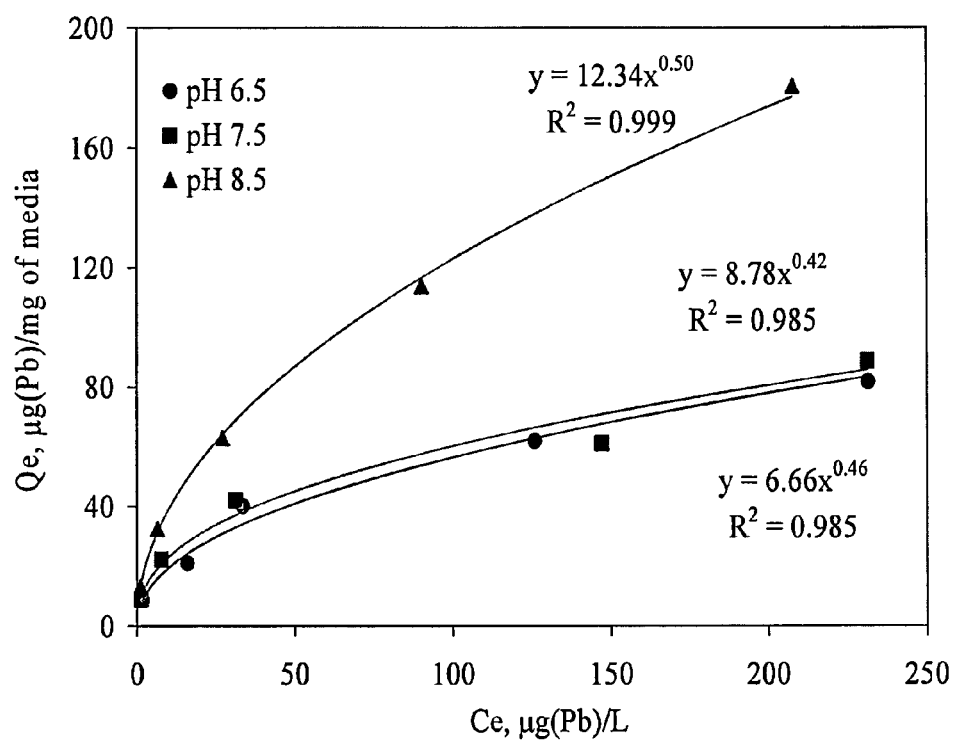
FIG. 21 graphically illustrates Pb(II) adsorption isotherms for a composite $Fe_2O_3$—$MnO_2$ media at various pHs.
Figure 22:
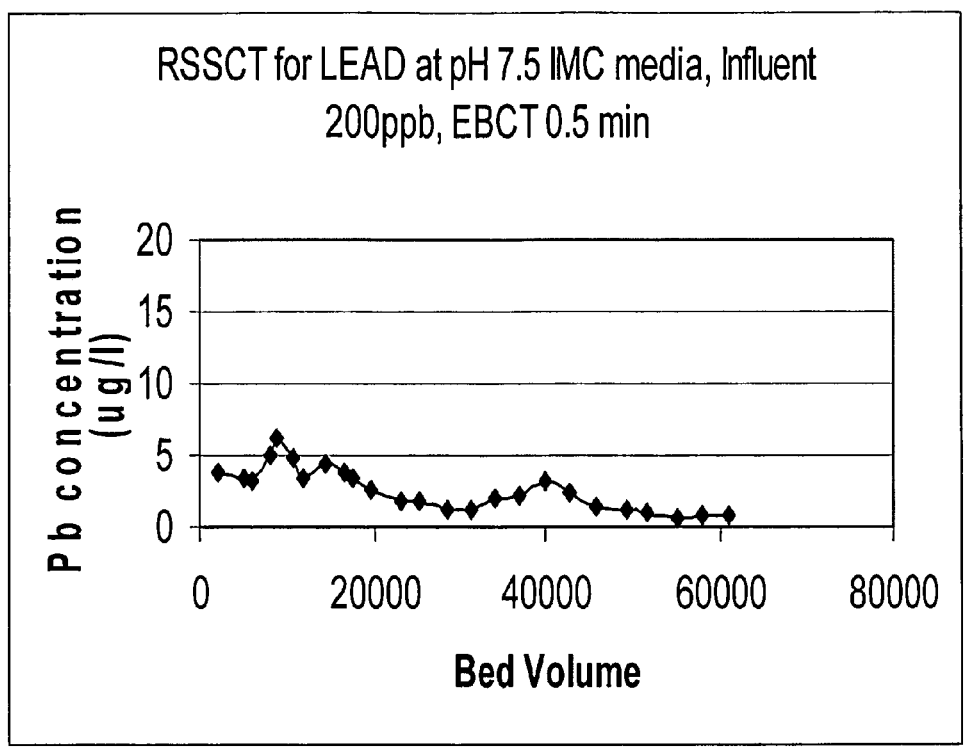
FIG. 22 graphically illustrates the breakthrough curve of Pb(II) for a composite $Fe_2O_3$—$MnO_2$ media at a pH of about 7.5.

Finally, Pb(II) adsorption isotherms and breakthrough curves were obtained for the composite $Fe_2O_3$—$MnO_2$ media. 500 µg/L $Pb^{2+}$ spiked NSF 53 challenge water was used. The 2-day isotherms at pHs of about 6.5, about 7.5, and about 8.5 are shown in FIG. 21. The data indicates that the media possessed high Pb(II) adsorption capacities. The maximum adsorption capacity was obtained at a pH of about 8.5 and the minimum was at a pH of about 6.5. pH-dependant adsorption of Pb(II) was expected because Pb(II) is a cationic species in water and it can exchange for protons on the surface of the media. The breakthrough of Pb(II) using the composite $Fe_2O_3$—$MnO_2$ (072105-B) media at a pH of about 7.5 was conducted with 200 ppb Pb(II) spiked NSF 53 challenge water. The results are shown in FIG. 22. No sign of breakthrough was shown even after about 60,000 BV run length, indicating that this media was highly effective in removing Pb(II) from water.

Example 6

Fabrication of Carbon Block Filtration Cartridge $Fe_2O_3$—$MnO_2$ composite granules were reprocessed into carbon block filtration cartridges for filtering water using a compression molding process. Each carbon block media contained 65 wt. % of activated carbon, 15 wt. % of the composite granules, and 20 wt. % of binder based on the total weight of the cartridge. A finely powdered activated carbon powder and the composite granules were been bonded together to form a totally uniform, solid profile to ensure multiple adsorption functions and kinetic efficiency. The cartridge is designed for flow in a radial, outside to inside direction, resulting in low pressure drop, high flow rate and increased dirt holding capacity.

Example 7

Zirconium Hydroxide and Titanium Hydroxide Synthesis and Characterization

Zirconium hydroxide, titanium hydroxide, and their doped forms were synthesized via co-precipitation of appropriate salt precursors with caustic solution similar to what was described above in Examples 1, 3, and 4. The salts used for the synthesis of zirconium hydroxide and titanium hydroxide were $ZrOCl_2$ and $TiOSO_4$, respectively. Dopants were introduced from corresponding salt precursors that were homogeneously mixed with $ZrOCl_2$ or $TiOSO_4$ solutions. To achieve steady and controllable reaction conditions, the precursors were added simultaneously into vigorously stirred water. The flow rates of both solutions were adjusted so that the pH of the produced hydroxide slurry was at a target value throughout the reaction. The hydroxides were then filtered and washed thoroughly with deionized water to remove unwanted byproducts and finally dried overnight in an oven at 120° C.

The SSA and total pore volume data for zirconium hydroxide, titanium hydroxide, and their doped forms are listed in Table 6. Doped hydroxides have a significantly higher surface area than their undoped counterparts. Titanium-based media exhibited a significantly greater SSA than the zirconium-based media. The total pore volume of titanium-based materials is also higher than that of zirconium-based materials, which suggested that titanium-based media were more porous than zirconium-based media.

TABLE 6

BET, SSA, and Pore Analysis Results

| Sample ID. | Material Description | SSA ($m^2/g$) | Pore Volume ($cm^3/g$) | Micropore Volume ($cm^3/g$) | Surface Area From Micropores ($m^2/g$) |
|---|---|---|---|---|---|
| I-1052-050304 | Zirconium hydroxide | 71 | 0.06 | 0.02 | 47 |
| I-1052-92804 | Mn-doped zirconium hydroxide | 197 | 0.20 | 0.06 | 92 |
| 120904 | Fe-doped zirconium hydroxide | 197 | 0.16 | 0.06 | 130 |
| I-1052-80504 | Titanium hydroxide | 306 | 0.19 | 0.12 | 238 |
| I-1052-092404A | Mn-doped titanium hydroxide | 447 | 0.47 | 0.1 | 178 |
| 120204A | Fe-doped titanium hydroxide | 370 | 0.36 | 0.04 | 76 |

The data revealed that undoped $Ti(OH)_4$ possesses a considerable amount of micropores (greater than about 60%), which contribute approximately 78% of its total surface area. Doping with manganese significantly increased the total pore volume of $Ti(OH)_4$, while the micropore volume decreased slightly from about 0.12 $cm^3/g$ to about 0.10 $cm^3/g$. This suggested that the doping created a significant amount of mesopores, resulting in a higher SSA. Compared to $Ti(OH)_4$, $Zr(OH)_4$ is less porous; but, like $Ti(OH)_4$, the porosity is significantly increased when doped. To summarize, doping has shown to be effective in increasing pore volume of these materials.

The PZCs of zirconium hydroxide and titanium hydroxide powders were found to be at pHs of about 8.08 and about 8.15, respectively. Doping with Mn slightly increased the PZCs of these materials to pHs of about 8.50 and about 8.24, respectively. When these materials were in contact with aqueous solutions that had pHs lower than their PZC, the surfaces of these materials developed a positive charge and encouraged the adsorption of negatively charged species in water, such as $H_2AsO_4^-$, $HAsO_4^{2-}$, and $AsO_4^{3-}$. The pH of drinking water is around 7.5. Thus, these two materials are expected to be able to quickly adsorb $H_2AsO_4^-$, and $HAsO_4^{2-}$ from drinking water.

Figure 23:
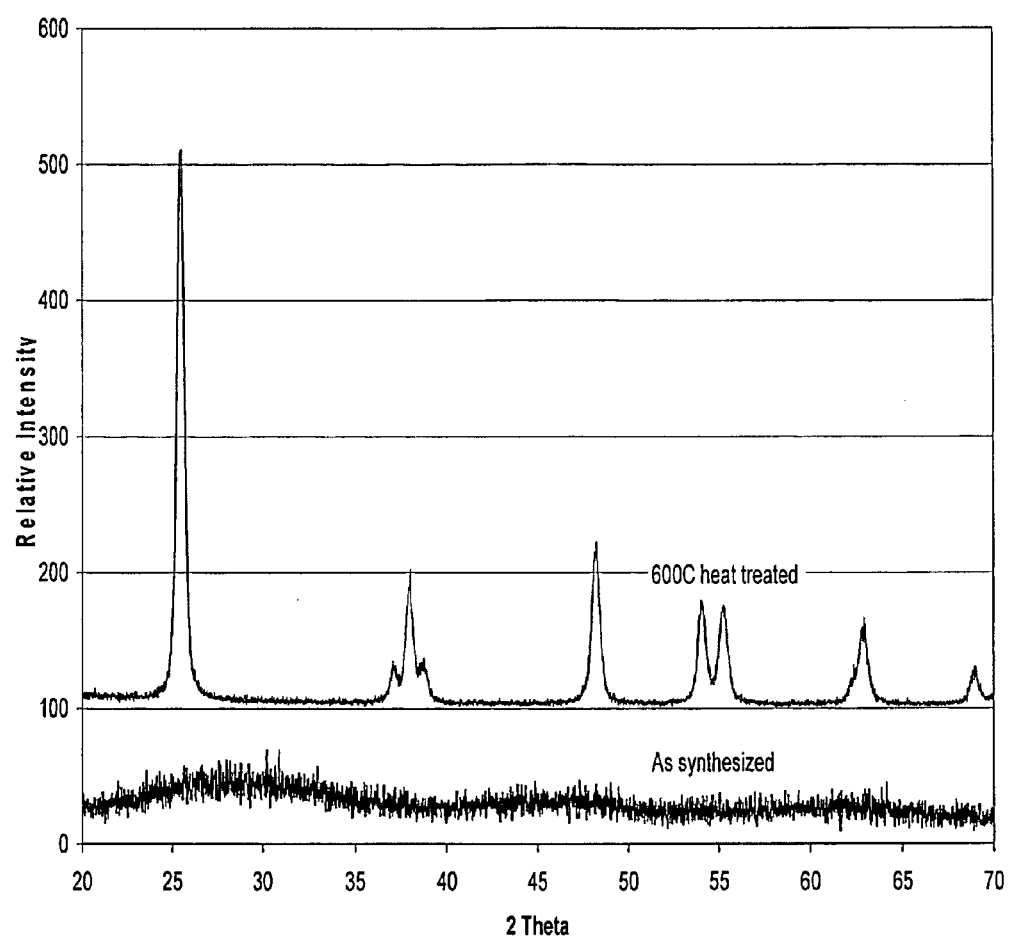
FIG. 23 illustrates powder X-ray diffraction patterns for an as-synthesized sample of $Ti(OH)_4$ and a heat treated sample of $Ti(OH)_4$.
Figure 24:
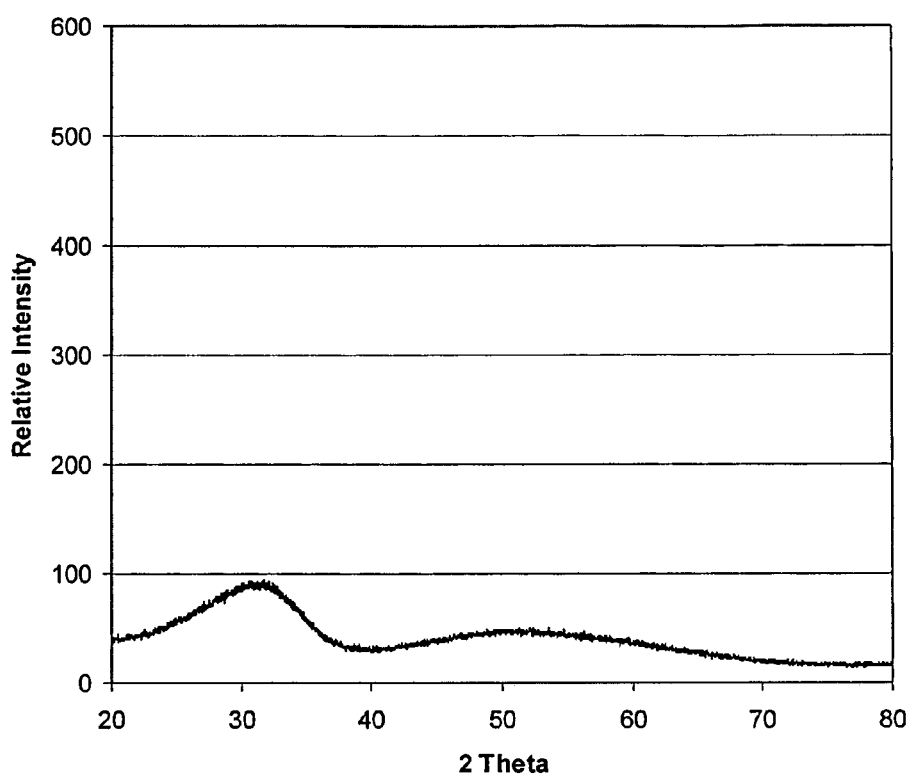
FIG. 24 illustrates a powder X-ray diffraction pattern for an as-synthesized sample of $Zr(OH)_4$.

XRD analysis on these samples revealed that the as-synthesized titanium hydroxide is amorphous but transforms into the anatase structure type of $TiO_2$ after a 600° C. heat treatment for about 2 hours. The powder XRD patterns are shown in FIG. 23. Similarly, the as-synthesized zirconium hydroxide is amorphous, as shown in the XRD pattern in FIG. 24.

Figure 25:
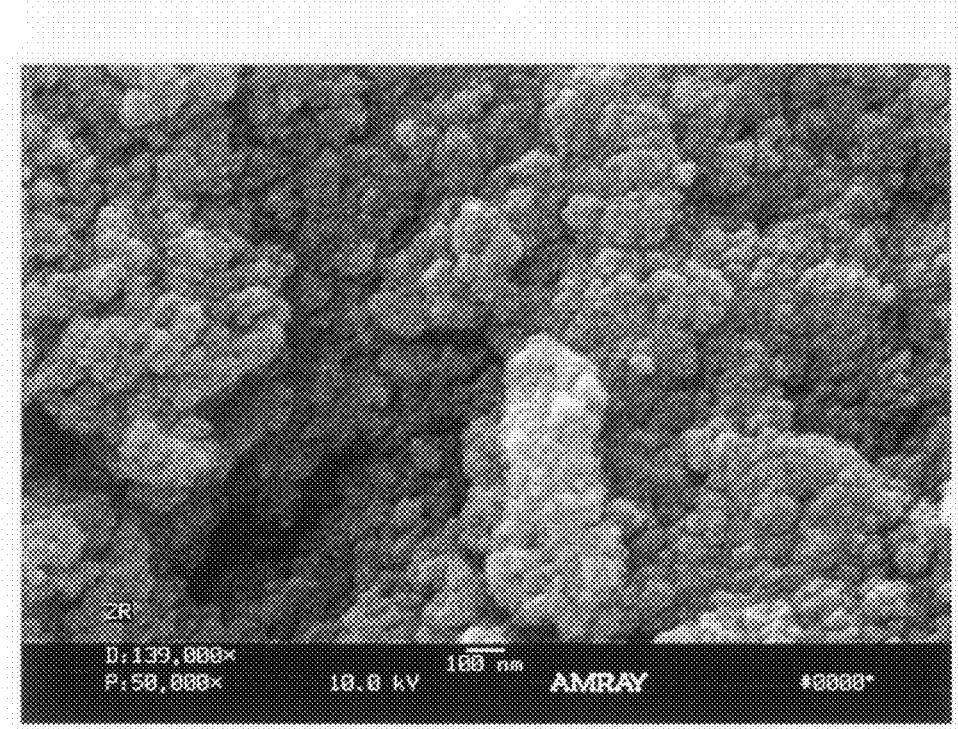
FIG. 25 is a SEM image of a nanostructured $Zr(OH)_4$ sample.
Figure 26:
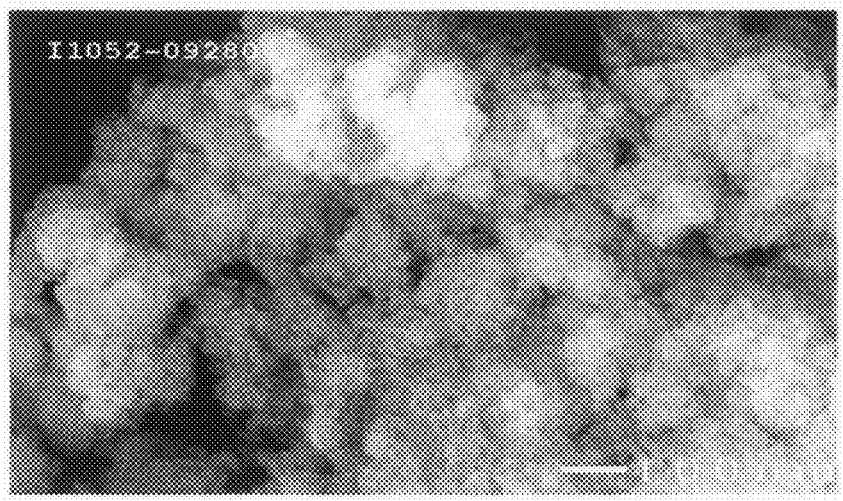
FIG. 26 is a SEM image of a nanostructured Mn-doped $Zr(OH)_4$ sample.
Figure 27:
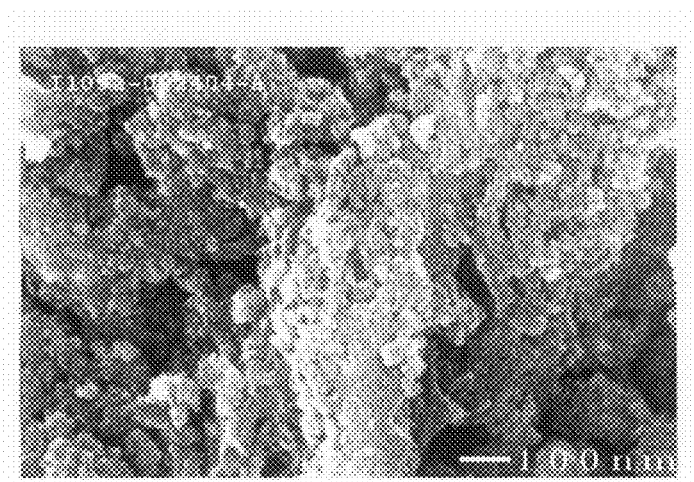
FIG. 27 is a SEM image of a nanostructured Mn-doped $Ti(OH)_4$ sample.

SEM images of undoped zirconium hydroxide, Mn-doped zirconium hydroxide, and Mn-doped titanium hydroxide are shown in FIGS. 25, 26, and 27, respectively. For easy comparison, the images are shown at the same magnification. FIG. 25 indicates that the zirconium hydroxide particles have an average size of about 20 nm, which agglomerate, forming mesopores and macropores between particles. The agglomeration in the Mn-doped zirconium hydroxide, shown in FIG. 26, appeared to be to a lesser extent compared with the undoped sample, resulting in a higher total pore volume. No changes in particle size were observed for this sample. Finally, the Mn-doped titanium hydroxide had an average particle size of about 10 nm. These agglomerates, as shown in FIG. 27, do not appear to be as porous as was indicated by pore analysis results. This is due to the material having a significant amount of micropores that are smaller than about 2 nm, which are not visible in the SEM image.

Example 8

Evaluation of Titanium- and Zirconium-based Components

In this example, adsorption isotherm tests were used as screening tests to identify the titanium-based and zirconium-based media that possessed the highest As(V) adsorption capacity from each group. The selected media were further evaluated for As(V) adsorption performance under various pHs and influence of competing ions. Finally, rapid small scale column tests were conducted to compare As(V) breakthrough of the selected media and compared with the commercially available benchmark, GFO.

The particle size of the as-synthesized powders was about 10 micrometers in diameter, which was not directly applicable for column tests. The nanoscale powders were reconstituted into porous spherical particles with an average particle size of approximately 200 micrometers in diameter.

Six different materials, including nanoporous $Zr(OH)_4(s)$ and $Ti(OH)_4(s)$ and their doped forms, were screened using two-day isotherm tests in 200 μg/L As(V) spiked NSF Challenge Water at a pH of 7.5, as described above in Examples 2 and 5. Dosages of materials in the 2-day isotherms tests and the results are listed in Tables 7 and 8 for the zirconium samples and the titanium samples, respectively.

The ability of these media to adsorb arsenic (V) from the challenge water was evaluated using batch isotherm tests. After developing the isotherms, the data were fitted to the Freundlich equation (2), shown above. The As(V) adsorption isotherm experiments were carried out using common background ions in the solution at three different pHs.

Figure 28:
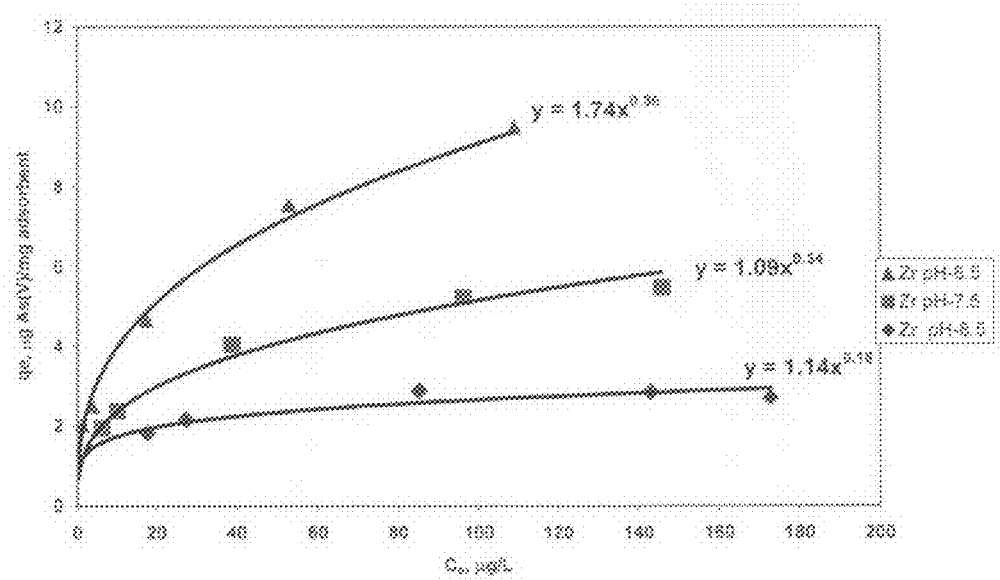
FIG. 28 graphically illustrates As(V) adsorption isotherms for a Mn-doped Zr-based adsorbent at various pH values.
Figure 29:
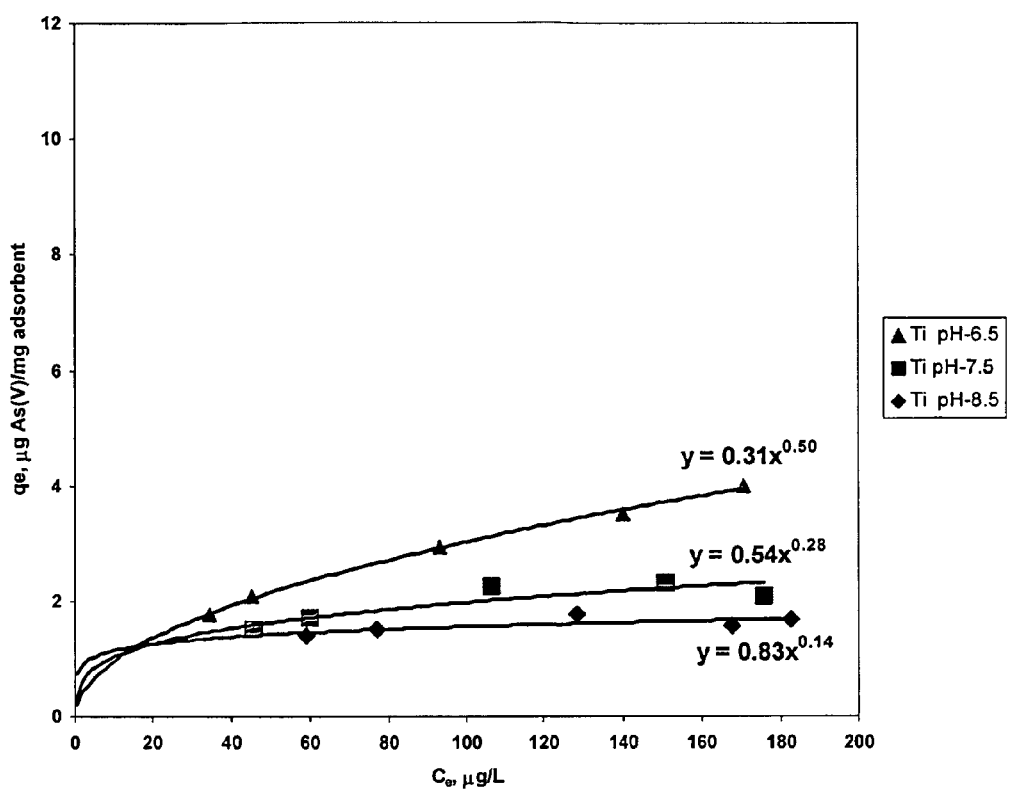
FIG. 29 graphically illustrates As(V) adsorption isotherms for a Mn-doped Ti-based adsorbent at various pH values.
Figure 30:
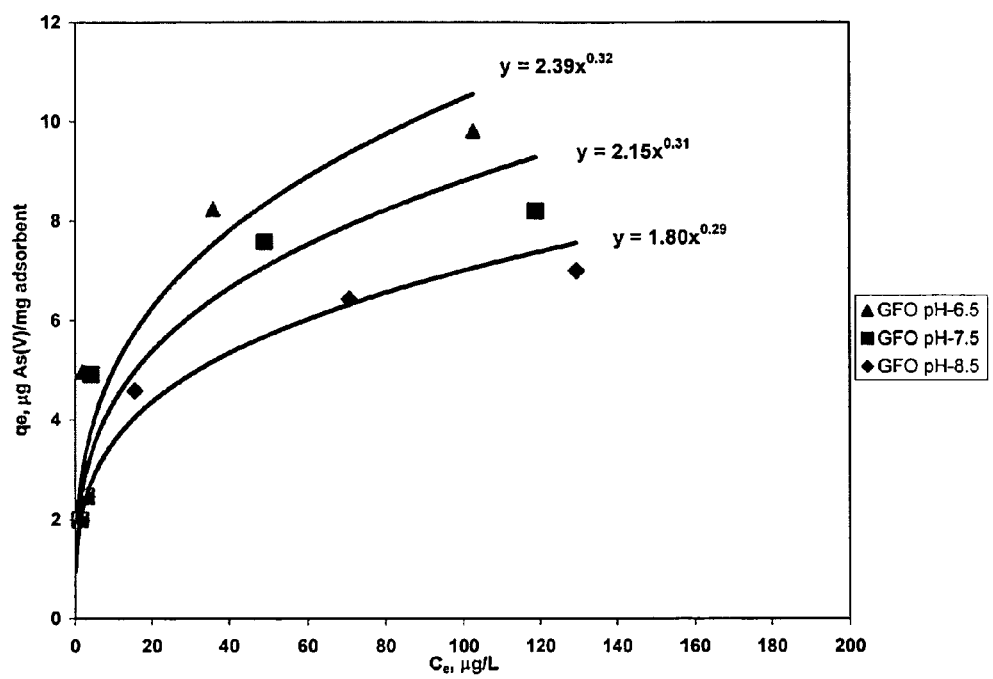
FIG. 30 graphically illustrates As(V) adsorption isotherms for a commercially available adsorbent, Granular Ferric Oxide (GFO), at various pH values.

FIG. 28 gives the 2-day As(V) adsorption isotherms of the Zr-based material. FIG. 29 shows the As(V) adsorption capacity of Ti-based material at pHs of about 6.5, about 7.5 and about 8.5. For comparison, the 2-day As(V) adsorption isotherms of GFO at the three different pH's are shown in FIG. 30. As indicated by the data, the As(V) adsorption capacities of the three materials were highest at a pH of about 6.5, with progressively less adsorption of arsenic at a pH of about 7.5 and about 8.5. Irrespective of pH, the GFO exhibited the highest As(V) adsorption capacity among the adsorbents. The Zr-based material exhibited a higher capacity than the Ti-based material at all pHs.

Batch isotherm tests with the NSF challenge water were conducted on the Mn-doped Zr- and Ti-based media at different pH's, with varying concentrations of competing ions, including silica (5 and 20 mg/L) and phosphate (0 and 40 μg/L).

First, two-day adsorption isotherms were performed with the challenge water containing 40 μg/L of phosphate (P). These results were compared with challenge water without phosphate (P=0 μg/L). For the GFO, phosphate did not have a significant impact on the As(V) adsorption capacity of GFO.

TABLE 7

Dosage of Zr-based materials in 2-day isotherms tests and the results

| dosage (mg/L) | Sample ID | Ce | qe | Sample ID | Ce | qe | Sample ID | Ce | qe |
|---|---|---|---|---|---|---|---|---|---|
| 0 | Z-A-0 | 189.58 | 0.00 | Z-B-0 | 192.04 | 0.00 | Z-C-0 | 200.47 | 0.00 |
| 10 | Z-A-1 | 143.10 | 4.65 | Z-B-1 | 183.94 | 0.81 | Z-C-1 | 179.33 | 2.11 |
| 20 | Z-A-2 | 83.24 | 5.32 | Z-B-2 | 170.92 | 1.06 | Z-C-2 | 153.89 | 2.33 |
| 40 | Z-A-4 | 48.13 | 3.54 | Z-B-4 | 138.79 | 1.33 | Z-C-4 | 110.61 | 2.25 |
| 80 | Z-A-8 | 9.40 | 2.25 | Z-B-8 | 110.29 | 1.02 | Z-C-8 | 51.51 | 1.86 |
| 100 | Z-A-10 | 6.76 | 1.83 | Z-B-10 | 88.24 | 1.04 | Z-C-10 | 36.05 | 1.64 |

Sample ID: Z = Zirconium compound; A = Mn-doped, B = undoped, and C = Fe-doped; and the number indicates dosage.

TABLE 8

Dosages of Ti-based materials in 2-day isotherms tests and the results

| dosage (mg/L) | Sample ID | Ce | qe | Sample ID | Ce | qe | Sample ID | Ce | qe |
|---|---|---|---|---|---|---|---|---|---|
| 0 | T-A-0 | 194.94 | 0 | T-B-0 | 196.55 | 0.00 | T-C-0 | 200.58 | 0.00 |
| 10 | T-A-1 | 180.88 | 1.40 | T-B-1 | 190.12 | 0.64 | T-C-1 | 191.93 | 0.86 |
| 20 | T-A-2 | 163.21 | 1.59 | T-B-2 | 179.28 | 0.86 | T-C-2 | 175.35 | 1.26 |
| 40 | T-A-4 | 112.13 | 2.07 | T-B-4 | 143.53 | 1.33 | T-C-4 | 145.80 | 1.37 |
| 80 | T-A-8 | 60.66 | 1.68 | T-B-8 | 113.48 | 1.04 | T-C-8 | 93.98 | 1.33 |
| 100 | T-A-10 | 40.44 | 1.54 | T-B-10 | 87.98 | 1.09 | T-C-10 | 83.71 | 1.17 |

Sample ID: T = Titanium compound; A = Mn-doped, B = undoped, and C = Fe-doped; and the number indicates dosage.

From the As(V) adsorption isotherms of zirconium-based media, it was clear that the Mn-doped zirconium sample possessed the highest adsorption capacity, followed by the Fe-doped media. Undoped media had the lowest adsorption capacities. Like their zirconium counterparts, the Mn-doped titanium-based media outperformed Fe-doped and undoped titanium-based media. Thus, Mn-doped Zr-based and Mn-doped Ti-based media were selected for further evaluation under pH variations and the influence of competing ions.

Though slightly better adsorption capacities were obtained in the absence of phosphate, it was not significant enough to say that, in the presence of silicate and other background ions, phosphate ions compete with the As(V) for adsorption sites at the tested concentration. The Mn-doped Zr- and Ti-based media followed similar trends. That is, there was no significant difference in absorption between the presence and absence of phosphate in the challenge water containing silicate and other background ions. The summary of the experimental results are presented in Table 9, from which it was concluded that the presence of phosphate did not reduce the adsorption capacities of the adsorbents.

TABLE 9

Comparison of As(V) removal capacities of media at $C_e = 50$ µg/L

| Media | pH = 6.5 | | pH = 7.5 | | pH = 8.5 | |
|---|---|---|---|---|---|---|
| | P = 0 µg/L | P = 40 µg/L | P = 0 µg/L | P = 40 µg/L | P = 0 µg/L | P = 40 µg/L |
| GFO | 9.32 | 8.35 | 8.7 | 7.22 | 6.35 | 5.59 |
| Zr-based | 6.86 | 7.1 | 3.95 | 4.12 | 3.08 | 2.3 |
| Ti-based | 2.37 | 2.19 | 1.9 | 1.67 | 1.61 | 1.43 |

Next, experiments were performed using the challenge water with the standard concentration of silica (about 20.0 mg/L) and with low silica (about 5.0 mg/L) concentrations to study the effect of silica on adsorption capacities of the GFO, Zr-based and Ti-based media at pHs of about 6.5 to about 8.5. The data is summarized in Table 10. Each of the materials performed better (i.e., adsorbed more As(V)) at the lower concentration of silica. At the higher concentration of silica, the silica competed with As(V) ions for sites on the adsorbents. At a pH of about 6.5 and a silica concentration of about 5.0 mg/L, the Zr-based media exhibited a slightly higher As(V) adsorption capacity than the GFO. The presence of silica greatly reduced the adsorption capacity of the Zr-based material. Under all other conditions, the As(V) adsorption capacity of the Zr-based media was much greater than that of Ti-based media.

TABLE 10

Comparison of As(V) removal capacities (in µg As(V)/mg) at $C_e = 50$ µg/L with silica at 5 and 20.0 mg/L

| Media | pH 6.5 | | pH 7.5 | | pH 8.5 | |
|---|---|---|---|---|---|---|
| | Si = 5.0 mg/L | Si = 20.0 mg/L | Si = 5.0 mg/L | Si = 20.0 mg/L | Si = 5.0 mg/L | Si = 20.0 mg/L |
| GFO | 9.79 | 8.35 | 8.1 | 7.22 | 7.2 | 5.59 |
| Zr-based | 10.1 | 7.1 | 7.09 | 4.12 | 5.2 | 2.3 |
| Ti-based | 3.46 | 2.19 | 2.57 | 1.67 | 2.29 | 1.43 |

Figure 31:
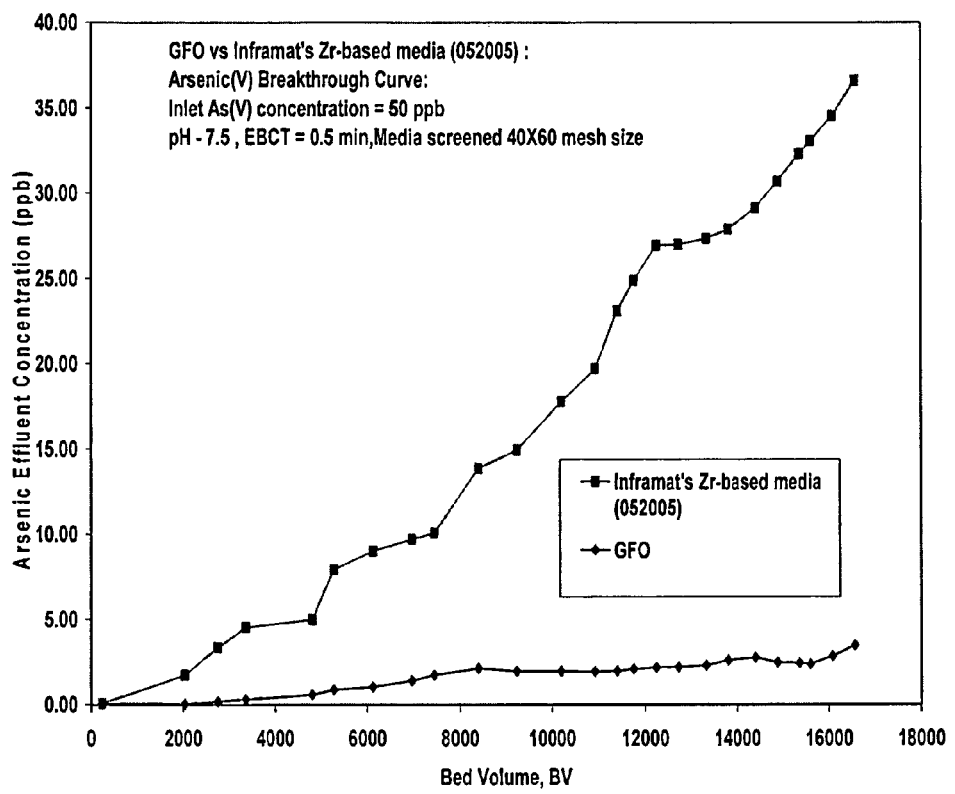
FIG. 31 graphically illustrates the breakthrough curves of As(V) for a Mn-doped Ti-based adsorbent and GFO at a pH of about 7.5.

RSSCTs were carried out to determine the relative breakthroughs of As(V) for the Zr-based media and the benchmark media, GFO at a pH of about 7.5. The RSSCTs were conducted as described above in Examples 2 and 5. As(V) breakthrough curves for the GFO and the Zr-based media are shown in FIG. 31. The Zr-based media reached about 10 mg/L MCL at about 6,000 BV throughput, whereas the GFO reached only about 40% of the MCL after about 16,000 BV.

Example 9

Preparation of Undoped $MnO_2$ Nanofibers $MnO_2$ nanofibers were synthesized using the following procedure. First, 9.0 grams (g) of manganese sulfate ($MnSO_4 \cdot H_2O$) was dissolved in 30 milliliters (mL) of deionized water, and 6.0 g of permanganate ($KMnO_4$) was dissolved in 100 mL of deionized water. The $MnSO_4$ solution was atomized and introduced to the $MnSO_4$ solution, resulting in a brownish colloidal suspension. The colloidal suspension was then heat-treated in the range of 100° C. to 120° C. for 2 to 24 hours (h) to gradually transform the amorphous particles into a random weave of nanofibers. The resulting nanofibers were filtered and washed with deionized water to remove the undesired reaction by-products. Finally, the material was dried in an oven at 100° C. for 6 to 12 h. The dried material was very fluffy and could be easily ground into fine powders.

Example 10

Preparation of Iron-Doped $MnO_2$ Nanofibers

The procedure in Example 9 was repeated except that a $Fe^{3+}$-containing solution was mixed with the $MnSO_4$ solution. As a result, ferric iron-doped $MnO_2$ was synthesized.

Example 11

$MnO_2$ Dissolution Tests

A series of tests were conducted to find out the dissolution of the undoped and Fe-doped $MnO_2$ samples prepared as described in Examples 9 and 10. The test method was adapted from National Sanitation Foundation (NSF) Standard 53 Sections 4.1 and 4.2. That is, local tap water containing 0.5±0.05 mg/L free chlorine and having a pH of 6.75±0.25 was used as the test water. First, 1.68 g of the material to be tested was soaked in 100 mL of the test water for 24 h. The water was then separated from the test material using a 0.2 micrometer (µm) disc filter for analysis. The water samples were analyzed for manganese concentration by an ICP-OES instrument.

The $MnO_2$ dissolution test results are shown in Table 11 below. The amount of manganese detected in a water sample containing undoped $MnO_2$ nanofibers (sample A) was 8,454 µg/L, whereas it was 4 µg/L in a water sample containing Fe-doped $MnO_2$ nanofibers (sample B). The difference was more than 2,000 times. This dramatic reduction in the dissolution of the manganese in the water sample resulted from the replacement of the $Mn^{3+}$ by the $Fe^{3+}$ dopant. Comparison of the dissolution results among the doped $MnO_2$ samples revealed that the dissolution increased to some extent with the increase of $Fe^{3+}$ amount in the starter solution. Without being limited by theory, it is believed that when the $Fe^{3+}$ amount exceeds the $Mn^{3+}$ amount in $MnO_2$, excess $Fe^{3+}$ ions replace $Mn^{4+}$ and create defects because the $Fe^{3+}$ radius is bigger than the $Mn^{4+}$ radius and oxygen vacancies can be created to maintain charge balance. These defects are expected to affect crystallinity and specific surface area (SSA) of the $MnO_2$ and are expected to affect its dissolution to some extent.

TABLE 11

| Sample No. | Fe(III):Mn(II) molar ratio in starter solution | Mn extraction (µg/L) | Fe extraction (µg/L) |
|---|---|---|---|
| A | 0 | 8,454 | Not Available |
| B | 0.04 | 4 | Not Detectable |
| C | 0.08 | 10 | Not Detectable |
| D | 0.16 | 42 | Not Detectable |
| E | 0.33 | 108 | Not Detectable |

Example 12

Other Characterizations

The phases of the undoped and Fe-doped $MnO_2$ samples were determined using Bruker D5005 and D8 X-ray diffractometers manufactured by Bruker AXS, Inc. The SSA of the samples was determined by $N_2$ adsorption according to the Braunauer, Emmett, and Teller (BET) method using the Quantachrome NOVA® 4200e surface area and pore size analyzer manufactured by Quantachrome Instruments.

Figure 34:
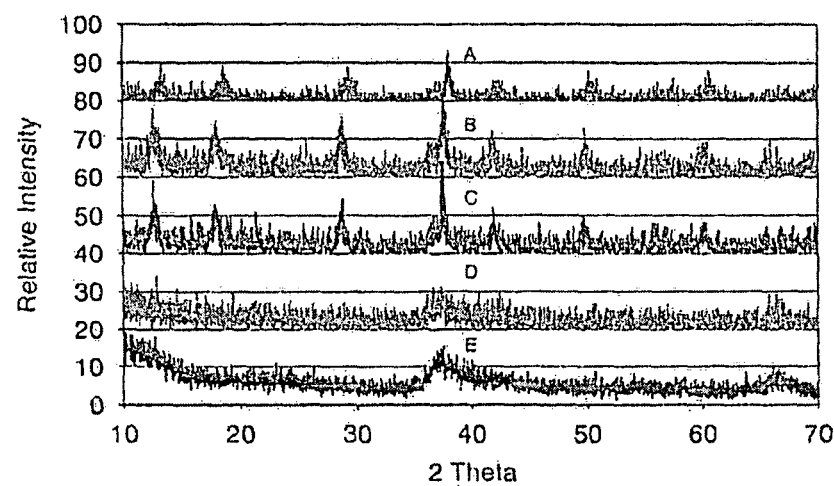
FIG. 34 depicts powder X-ray diffraction patterns for manganese dioxide synthesized with different ratios of $Fe^{3+}$ to $Mn^{2+}$ in the aqueous starter solutions.

The X-ray diffraction (XRD) patterns of the undoped and Fe-doped $MnO_2$ samples are shown in FIG. 34. The undoped $MnO_2$ possessed an α-$MnO_2$ structure. A small amount of iron dopant did not seem to affect the $MnO_2$ structure, as both samples B and C had XRD patterns similar to sample A. However, the crystallinity of the $MnO_2$ was severely degraded in samples D and E, which had increased amounts of the iron dopant. Without being limited by theory, it is believed that when a high dosage of $Fe^{3+}$ was used, excess $Fe^{3+}$ ions replaced $Mn^{4+}$, creating defects to maintain the charge balance and accommodate the radius difference between $Fe^{3+}$ and $Mn^{4+}$ ions. These defects degraded crystallinity and increased $MnO_2$ dissolution to some extent compared with lower dosage $Fe^{3+}$ doped-$MnO_2$.

The SSA and pore characteristics of the $MnO_2$ samples are shown in Table 12 below. Comparison among the Fe-doped $MnO_2$ samples revealed that the SSA increased with the increase of $Fe^{3+}$ dopant amount, as did the dissolution. This increase in dissolution with increase in SSA was expected since material dissolution involves the solid/solution interface reaction. The SSA of Fe-doped $MnO_2$ was higher than that of undoped $MnO_2$. However, the dissolution of Fe-doped $MnO_2$ was much lower than that of undoped $MnO_2$, which suggests that the dissolution caused by a higher SSA was far less significant than the dissolution caused by the presence of $Mn^{3+}$ in undoped $MnO_2$. The data in Table 12 also shows that samples D and E, which contained higher amounts of $Fe^{3+}$ dopant, possessed a substantial amount of micropores. The term "micropore" is defined herein as a pore having a diameter smaller than 20 Angstroms. These micropores were related to defects caused by the substitution of $Mn^{4+}$ by $Fe^{3+}$. The creation of the micropores degraded crystallinity and increased SSA. Consequently, samples D and E exhibited higher amounts of $MnO_2$ dissolution than the samples containing lower $Fe^{3+}$ dopant amounts.

TABLE 12

| Sample No. | Fe(III):Mn(II) molar ratio in starter solution | SSA (m²/g) | Pore volume (cc/g) | Micropore volume (cc/g) | Surface area from micropore (m²/g) |
| --- | --- | --- | --- | --- | --- |
| A | 0 | 112 | 0.37 | 0.001 | 2.7 |
| B | 0.04 | 172 | 0.32 | 0 | 0 |
| C | 0.08 | 203 | 0.33 | 0 | 0 |
| D | 0.16 | 431 | 0.39 | 0.13 | 213 |
| E | 0.33 | 503 | 0.44 | 0.19 | 319 |

As used herein, the terms "a" and "an" do not denote a limitation of quantity, but rather denote the presence of at least one of the referenced items. Moreover, the endpoints of all ranges directed to the same component or property are inclusive of the endpoint and independently combinable (e.g., "up to about 25 wt. %, or, more specifically, about 5 wt. % to about 20 wt. %," is inclusive of the endpoints and all intermediate values of the ranges of "about 5 wt. % to about 25 wt. %," etc.). Reference throughout the specification to "one embodiment", "another embodiment", "an embodiment", and so forth means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments. Unless defined otherwise, technical and scientific terms used herein have the same meaning as is commonly understood by one of skill in the art to which this invention belongs.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A composition of matter comprising: a nanostructured oxide or hydroxide doped with $Mn^{4+}$; wherein the nanostructured oxide or hydroxide comprises nanofibers having diameters of less than about 250 nanometers; and wherein the nanofibers have an aspect ratio greater than about 10.

2. The composition of matter of claim 1, wherein the nanofibers are spaced about 0.5 to about 200 nanometers apart from each other.

3. The composition of matter of claim 1, wherein the nanostructured oxide or hydroxide comprises particles having diameters of about 1 to about 100 nanometers.

4. The composition of matter of claim 3, wherein the particles are arranged in agglomerates having diameters of about 0.1 to about 200 microns.

5. The composition of matter of claim 1, wherein the nanostructured oxide or hydroxide has a porosity greater than about 60 volume %.

6. The composition of matter of any one of claims 1 or 2-5, wherein the nanostructured oxide or hydroxide comprises nickel, yttrium, zirconium, aluminum, silicon, magnesium, vanadium, molybdenum, zinc, silver, titanium, iron, cobalt, copper, tungsten, or a rare earth metal.

7. The composition of matter of claim 1, wherein the composition of matter is a water treatment composition or a nuclear waste treatment composition.

8. A method of making the composition of matter of claim 1, comprising:
   forming a nanostructured oxide or hydroxide material doped with $Mn^{3+}$; and
   oxidizing the $Mn^{3+}$ to $Mn^{4+}$ to reduce dissolution of the $Mn^{3+}$ in the nanostructured oxide or hydroxide material.

9. The method of claim 8, wherein said forming the nanostructured oxide or hydroxide material doped with $Mn^{3+}$ comprises:
   combining a manganese salt and a metal salt with an aqueous starter solution;
   combining an oxidant with an aqueous reactant solution; and
   combining the aqueous reactant solution with the aqueous starter solution to precipitate the nanostructured oxide or hydroxide material; wherein $Mn^{2+}$ in the aqueous starter solution is oxidized to $Mn^{3+}$.

10. The method of claim 9, further comprising heat treating the nanostructured oxide or hydroxide.

11. The method of claim 9 or 10, wherein a mole ratio of the manganese salt to the metal salt in the aqueous starter solution is about 0.1 to about 0.5.

* * * * *